(12) United States Patent
 Lin et al.

(10) Patent No.: US 10,606,098 B2
(45) Date of Patent: Mar. 31, 2020

(54) DEVICE FOR MIXED REALITY

(71) Applicant: AmTRAN Technology Co., Ltd., New Taipei (TW)

(72) Inventors: Huang-Pin Lin, Taipei (TW); Mu-Hsuan Lee, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 58 days.

(21) Appl. No.: 15/974,666

(22) Filed: May 8, 2018

(65) Prior Publication Data

US 2018/0329222 A1 Nov. 15, 2018

Related U.S. Application Data

(60) Provisional application No. 62/503,343, filed on May 9, 2017, provisional application No. 62/537,464, filed on Jul. 27, 2017.

(51) Int. Cl.
| | | |
|---|---|---|
| *A45C 11/00* | (2006.01) | |
| *G02B 27/01* | (2006.01) | |
| *G02B 30/56* | (2020.01) | |
| *G02B 27/02* | (2006.01) | |
| *G02B 7/182* | (2006.01) | |
| *G03H 1/04* | (2006.01) | |

(Continued)

(52) U.S. Cl.
CPC ............ *G02B 30/56* (2020.01); *G02B 7/182* (2013.01); *G02B 7/1824* (2013.01); *G02B 27/0149* (2013.01); *G02B 27/027* (2013.01); *G02B 27/028* (2013.01); *G02B 27/04* (2013.01); *G03H 1/0005* (2013.01); *G03H 1/04* (2013.01); *G03H 2227/02* (2013.01); *G03H 2227/05* (2013.01)

(58) Field of Classification Search
CPC ............ G02B 27/0149; G02B 27/2292; G02B 27/027; G02B 27/028; G02B 27/04; G02B 27/02; G02B 27/021; G02B 27/022; G02B 2027/0165; A45C 2011/002
See application file for complete search history.

(56) References Cited

U.S. PATENT DOCUMENTS

| | | | |
|---|---|---|---|
| 9,470,893 | B2 | 10/2016 | Bickerstaff et al. |
| 9,606,506 | B2 | 3/2017 | Large et al. |

(Continued)

FOREIGN PATENT DOCUMENTS

| | | |
|---|---|---|
| CN | 101287141 A | 10/2008 |
| CN | 204613517 U | 9/2015 |

(Continued)

OTHER PUBLICATIONS

Takahashi et al.; JP2014-107725A; Jun. 9, 2014; Machine Translation in English (Year: 2014).*

*Primary Examiner* — Ryan D Howard
(74) *Attorney, Agent, or Firm* — CKC & Partners Co., LLC

(57) ABSTRACT

A device for mixed reality includes a curved mirror and a first holder. The curved mirror has a concave surface, a convex surface opposite to the concave surface, and a light transmissive medium between the concave surface and the convex surface. The first holder is disposed in front of the concave surface and within a focal length of the curved mirror and configured to support a portable apparatus. The first holder has a curved surface configured to reflect a sound wave from the portable apparatus to the curved mirror.

20 Claims, 25 Drawing Sheets

(51) Int. Cl.
*G03H 1/00* (2006.01)
*G02B 27/04* (2006.01)

(56) References Cited

U.S. PATENT DOCUMENTS

| | | |
|---|---|---|
| 2008/0043097 A1 | 2/2008 | Smith |
| 2011/0148904 A1 | 6/2011 | Kotani |
| 2014/0320828 A1 | 10/2014 | Kim et al. |
| 2015/0264339 A1 | 9/2015 | Riedel |

FOREIGN PATENT DOCUMENTS

| | | |
|---|---|---|
| JP | 3658951 B2 | 6/2005 |
| JP | 2014107725 A | 6/2014 |
| TW | 201329853 A | 7/2013 |
| TW | 201527683 A | 7/2015 |
| TW | 201537228 A | 10/2015 |
| TW | 201624175 A | 7/2016 |
| WO | 2014190221 A1 | 11/2014 |
| WO | 2016148663 A1 | 9/2016 |
| WO | 2016182090 A1 | 11/2016 |

\* cited by examiner

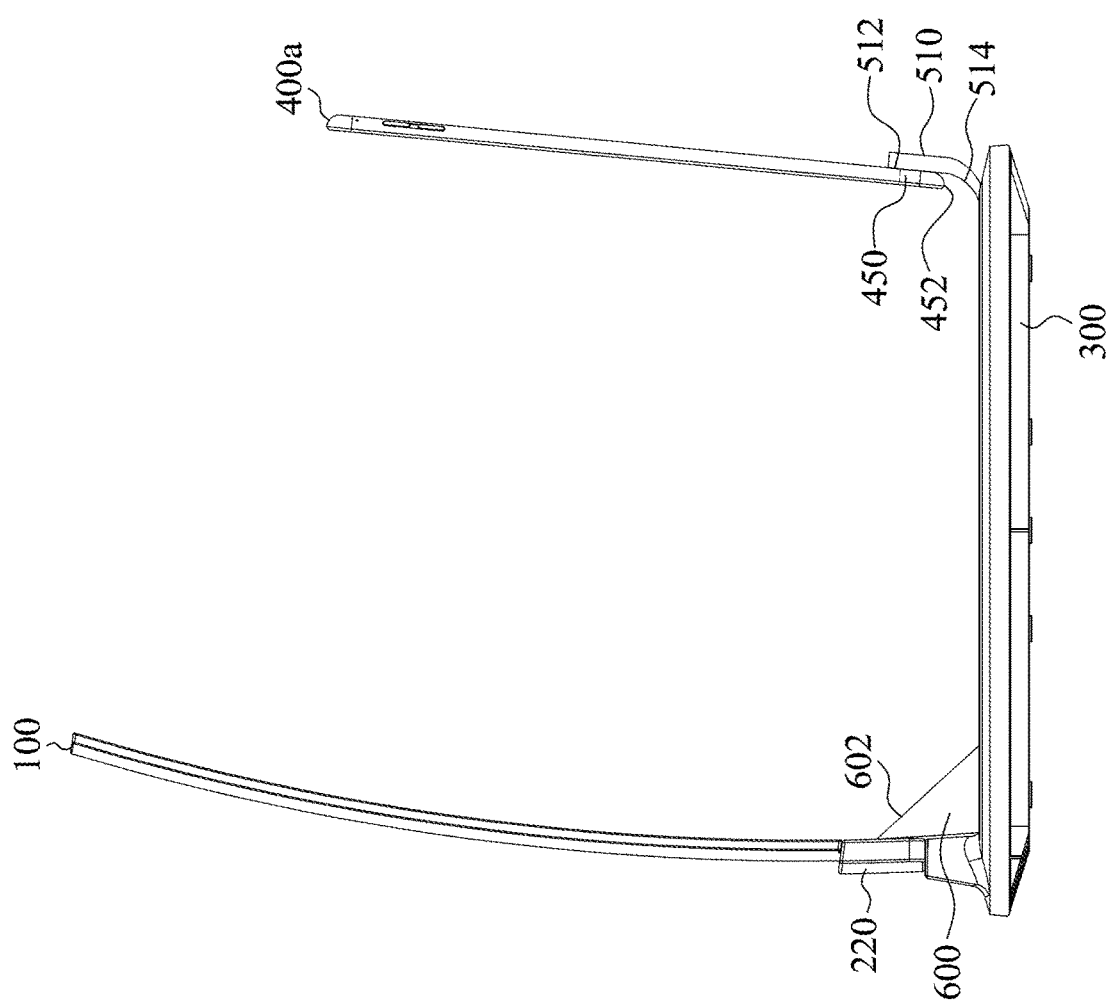

DEVICE FOR MIXED REALITY

CROSS-REFERENCE TO RELATED APPLICATION

This application claims priority to U.S. Provisional Application Ser. No. 62/503,343, filed May 9, 2017, and U.S. Provisional Application Ser. No. 62/537,464, filed Jul. 27, 2017, which are herein incorporated by reference.

BACKGROUND

Technical Field

The present disclosure relates to mixed reality.

Description of Related Art

In recent years, virtual reality or mixed reality has become a new way of interaction between a user and an electronic apparatus. At present, a typical way of interaction involves allowing the user to interact with the display image of an electronic apparatus (e.g., smartphone). For example, the user can view the display panel of a smartphone and interact with a character displayed on the display panel.

SUMMARY

The present disclosure provides a method of human-computer interaction different from traditional methods. In particular, the present disclosure involves the generation of a virtual image in space according to a display image of a portable apparatus, such that a user may have a more interesting interaction experience.

In some embodiments, a device for mixed reality comprises a curved mirror and a first holder. The curved mirror has a concave surface, a convex surface opposite to the concave surface, and a light transmissive medium between the concave surface and the convex surface. The first holder is disposed in front of the concave surface and within a focal length of the curved mirror and configured to support a portable apparatus. The first holder has a curved surface configured to reflect a sound wave from the portable apparatus to the curved mirror.

In some embodiments, a device for mixed reality comprises a base, a curved mirror, a first holder, and a speaker. The curved mirror stands on the base and has a concave surface, a convex surface opposite to the concave surface, and a light transmissive medium disposed between the concave surface and the convex surface. The first holder stands on the base and disposed in front of the concave surface and within a focal length of the curved mirror and configured to support a portable apparatus. The speaker is disposed on the base and adjacent to the curved mirror. The speaker emits sound in a direction that the concave surface of the curved mirror faces.

In some embodiments, a device for mixed reality comprises a base, a curved mirror, a first holder, and a speaker. The curved mirror stands on the base and has a concave surface, a convex surface opposite to the concave surface, and a light transmissive medium disposed between the concave surface and the convex surface. The first holder stands on the base and disposed in front of the concave surface and within a focal length of the curved mirror and configured to support a portable apparatus. The speaker is disposed on the base. The curved mirror produces a virtual image by an image displayed by the portable apparatus. When a change of the virtual image occurs, the speaker emits a sound in response to the change of the virtual image.

In the above-mentioned embodiments, the display apparatus is within the focal length of the curved mirror, so the image of the display apparatus may form an enlarged virtual image behind the curved mirror. Therefore, when the image of the display apparatus changes according to the motion of the user or the motion of the real object operated by the user, the virtual image will change accordingly, and this provides a more interesting experience to the user. In particular, the curved surface of the first holder can reflect the sound wave from the portable apparatus to the curved mirror. Then, the curved mirror reflects the sound wave toward the portable apparatus so that the user may feel that it's from the curved mirror and therefore this provides a richer interaction experience to the user.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 14 is a side view of the mixed reality assembly in accordance with some embodiments of the present disclosure;

DETAILED DESCRIPTION

Figure 1:
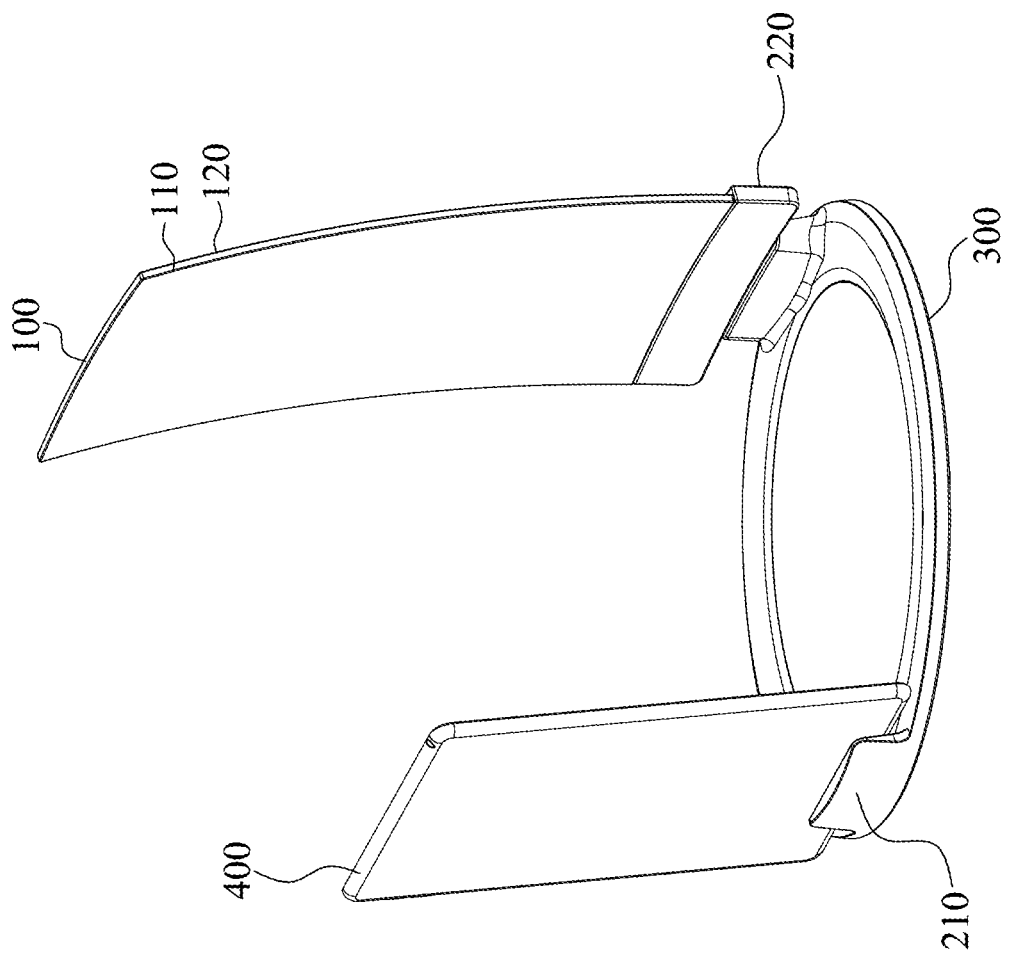
FIG. 1 is a perspective view of a mixed reality assembly in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 illustrates a perspective view of a mixed reality assembly according to some embodiments of the present disclosure. As shown in FIG. 1, the mixed reality assembly includes a curved mirror 100 and a portable apparatus 400. The curved mirror 100 includes a concave surface 110, a convex surface 120 opposite to the concave surface 110, and a light transmissive medium (not shown) between the concave surface 110 and the convex surface 120. The portable apparatus 400 can be a portable apparatus having a display apparatus (not shown), such as a smartphone or a tablet computer. The curved mirror 100 may be a spherical mirror having a spherical diameter in a range from about 600 mm to about 1400 mm or may be other suitable curved mirror which corresponds to a size of the portable apparatus 400. The portable apparatus 400 is in front of the concave surface 110 and within a focal length of the curved mirror 100 at the time of use. In particular, a distance between the portable apparatus 400 and the concave surface 110 is less than a focal length of the curved mirror 100 (e.g., 60 cm). For example, the distance between the portable apparatus 400 and the concave surface 110 is from about 20 cm to about 50 cm. Applying the imaging principle of geometrical optics, when the portable apparatus 400 is within a focal length of the curved mirror 100, the portable apparatus 400 and the displayed image will form an enlarged virtual image behind the curved mirror 100. Therefore, when the image of the portable apparatus 400 changes, the enlarged virtual image will change as well. The embodiments of the present disclosure utilize changes in the enlarged virtual image to let the user have an interaction experience, which will be discussed below.

Figure 2:
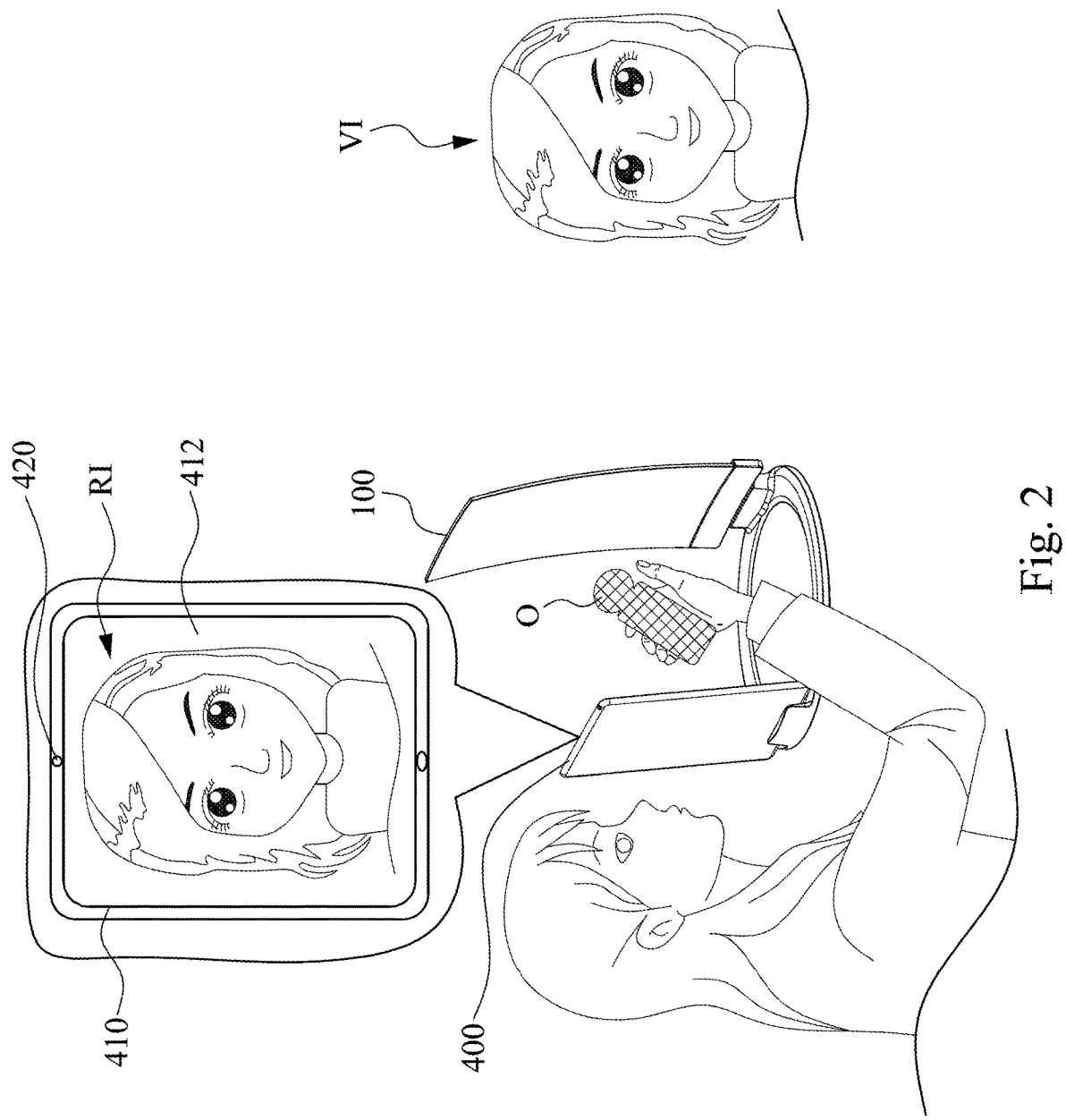
FIGS. 2 and 3 illustrate one operation scenario of the mixed reality assembly shown in FIG. 1.
Figure 3:
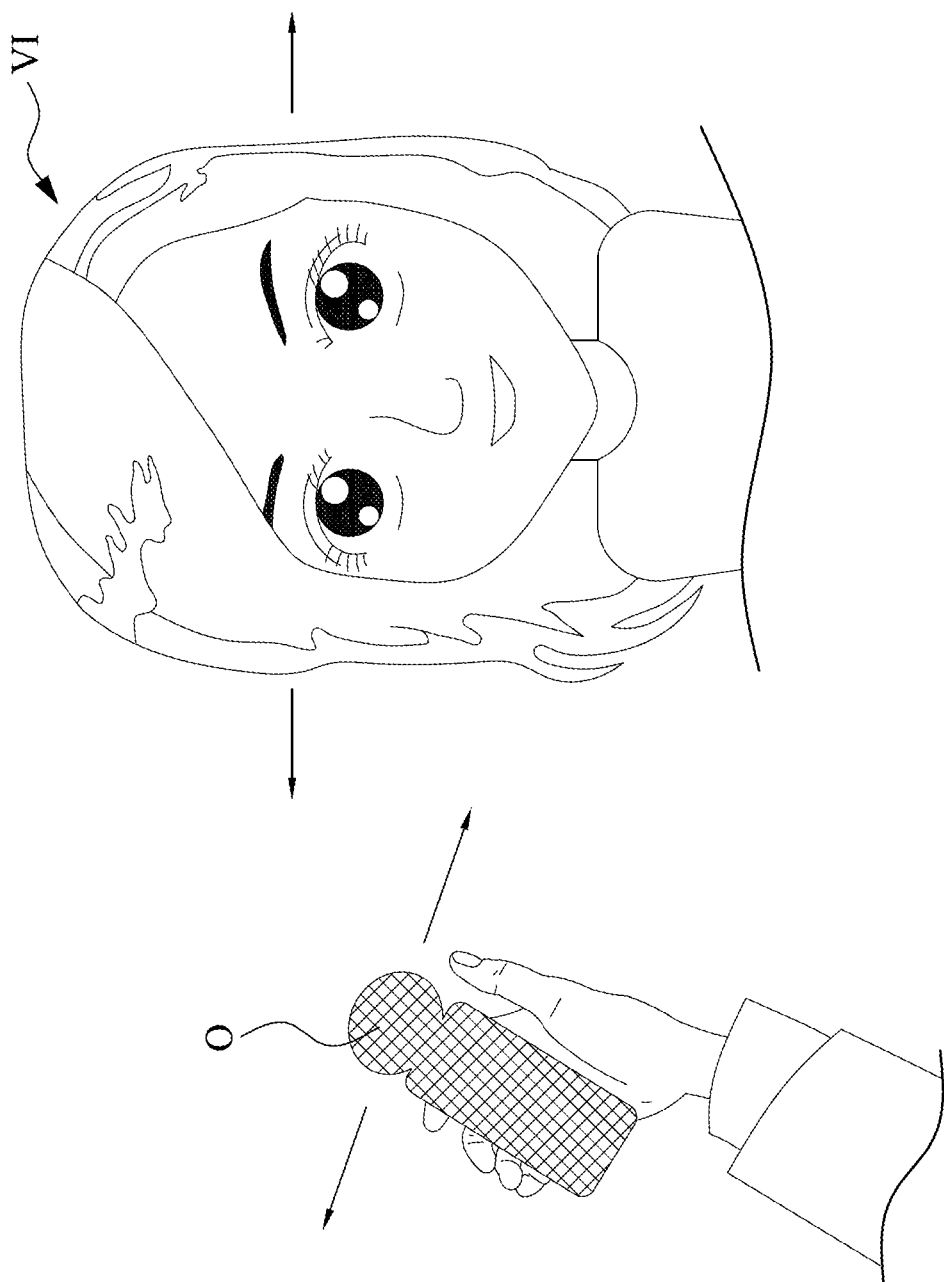

FIGS. 2 and 3 illustrate an operation scenario of the mixed reality assembly shown in FIG. 1. In some embodiments, the portable apparatus 400 includes a display apparatus 410 and a motion detection module 420. The display apparatus 410 has a display surface 412 facing the curved mirror 100, and can display an image on the display surface 412. The image may also be referred to as a real image RI. The display surface 412 of the display apparatus 410 is within the focal length of the curved mirror 100, so an enlarged virtual image VI corresponding to the real image RI is formed behind the curved mirror 100. That is to say, the pattern of the real image RI is the same as that of the enlarged virtual image VI, while a size of the enlarged image VI is greater than that of the real image RI. For example, the enlarged virtual image VI may be a proportionally enlarged pattern of the real image RI. The motion detection module 420 is configured to detect a motion of a real object O in front of the display surface 412 (e.g., the real object O illustrated in FIG. 3 moves in the direction of arrows on two sides thereof in a side-to-side manner). The display apparatus 410 can change the displayed real image RI according to the motion of the detected real object O, and thereby change an enlarged virtual image VI behind the curved mirror 100 (e.g., the enlarged virtual image V illustrated in FIG. 3 moves in the direction of arrows on two sides thereof in a side-to-side manner). The change of the enlarged virtual image VI is induced by the motion of the real object O, such that the user can have an interaction experience of the enlarged virtual image VI and the real object O. In addition, because the interaction perceived by the user is from the enlarged virtual image VI behind the curved mirror 100 and not from the real image RI displayed by the display apparatus 410, the user can have a newer and more interesting interaction experience.

Figure 5:
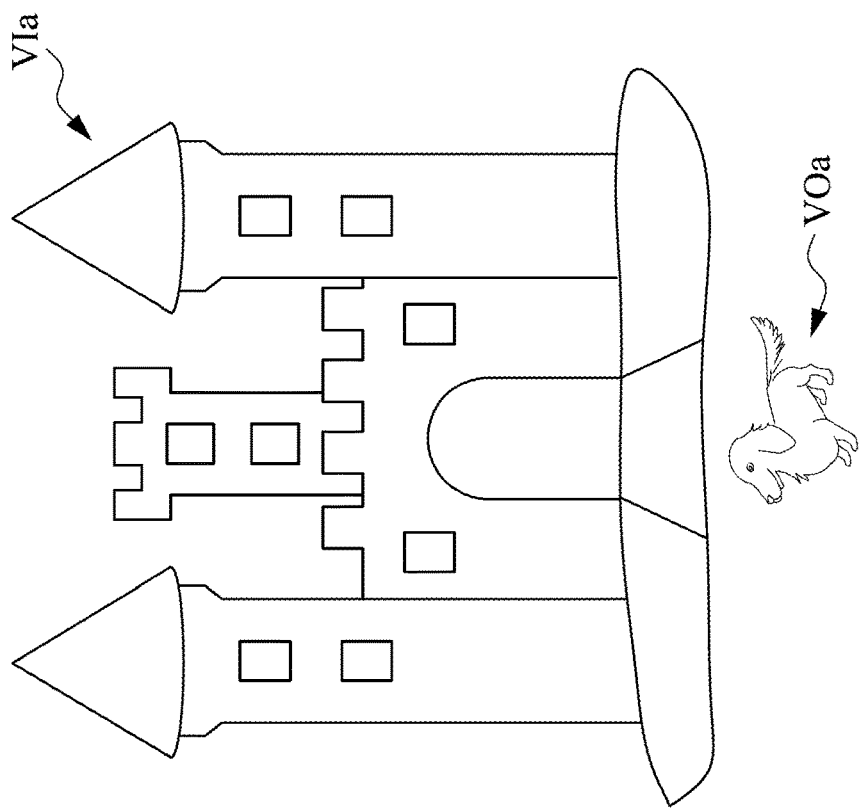
FIGS. 4-7 illustrate another operation scenario of the mixed reality assembly shown in FIG. 1.
Figure 4:
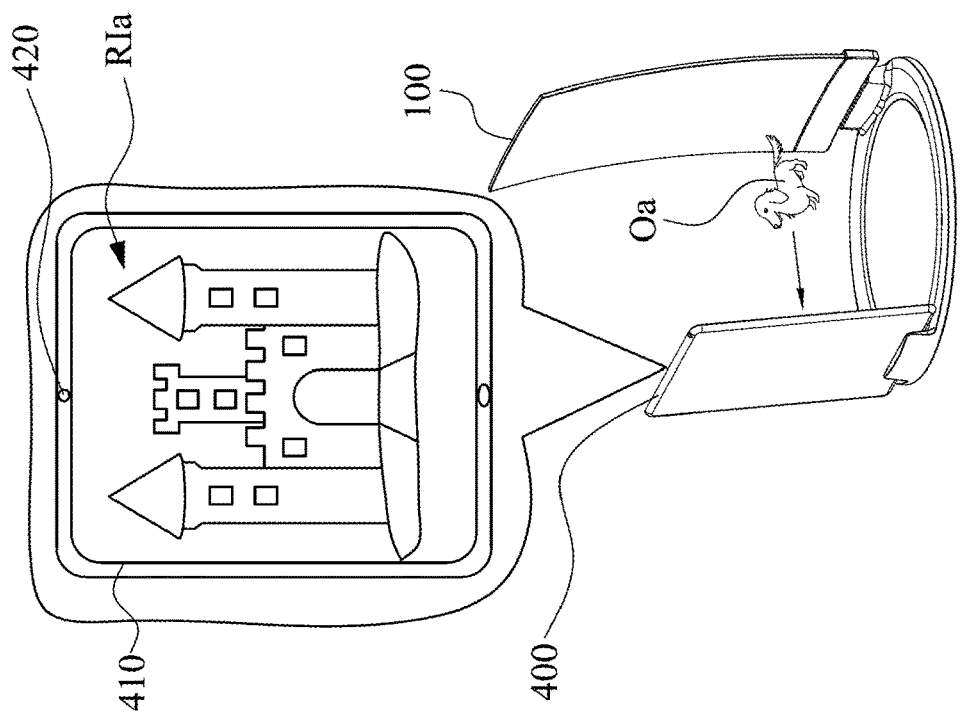
Figure 7:
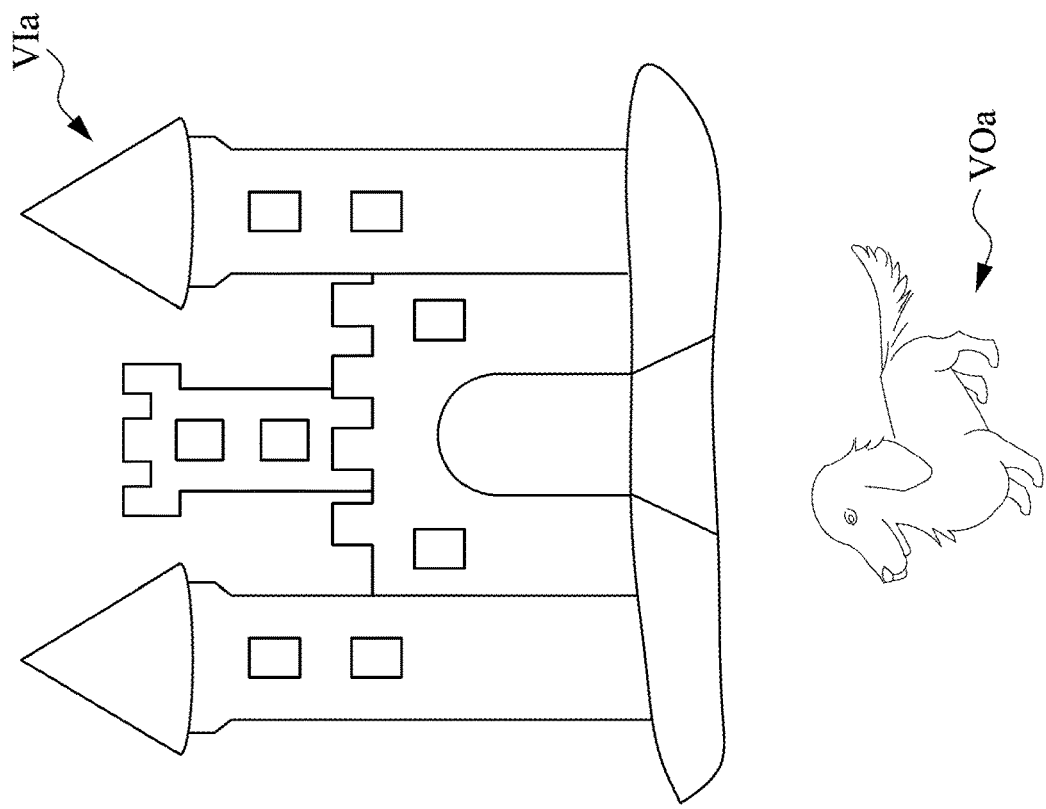
Figure 6:
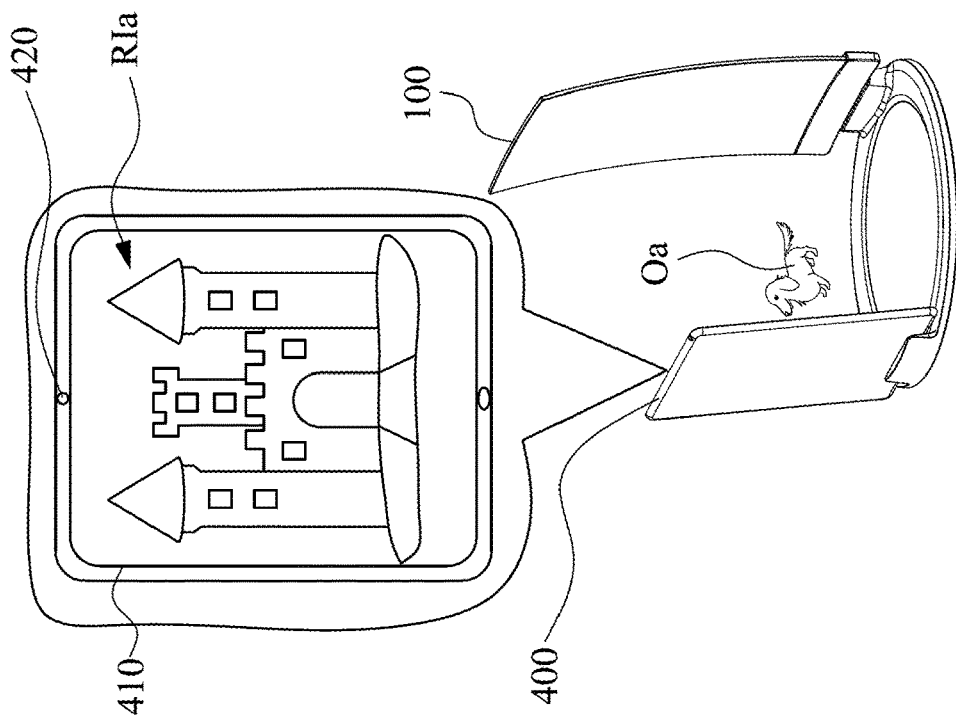

FIGS. 4 to 7 illustrate another operation scenario of the mixed reality assembly shown in FIG. 1. As shown in FIGS. 4 and 5, the real object Oa is between the curved mirror 100 and the portable apparatus 400, and so the real object Oa is within the focal length of the curved mirror 100. Therefore, the real object Oa is formed as an enlarged object virtual image VOa corresponding to the real object Oa behind the curved mirror 100. That is to say, an appearance of the enlarged object virtual image VOa is the same as that of the real object Oa, while a size of the enlarged object virtual image VOa is greater than that of the real object Oa. For example, the enlarged object virtual image VOa can be a proportionally enlarged pattern of the real object Oa. When the user moves the real object Oa, the enlarged object virtual image VOa behind the curved mirror 100 will move as well, and therefore the user can interact with the virtual image VIa behind the curved mirror 100 formed correspondingly by the real image RIa of the display surface 412. For example, the real image RIa of the display surface 412 can be a static image (e.g., a static castle), and forms a static virtual image VIa behind the curved mirror 100. When the user moves the real object Oa toward the portable apparatus 400 (e.g., in the direction of the arrow shown in FIG. 4 to a position shown in FIG. 6), a distance between the real object Oa and the curved mirror 100 increases, such that the enlarged object virtual image VOa is further enlarged (e.g., the pattern shown in FIG. 5 is enlarged to the pattern shown in FIG. 7). As a result, the user may have a new and more interesting interaction experience.

Figure 8:
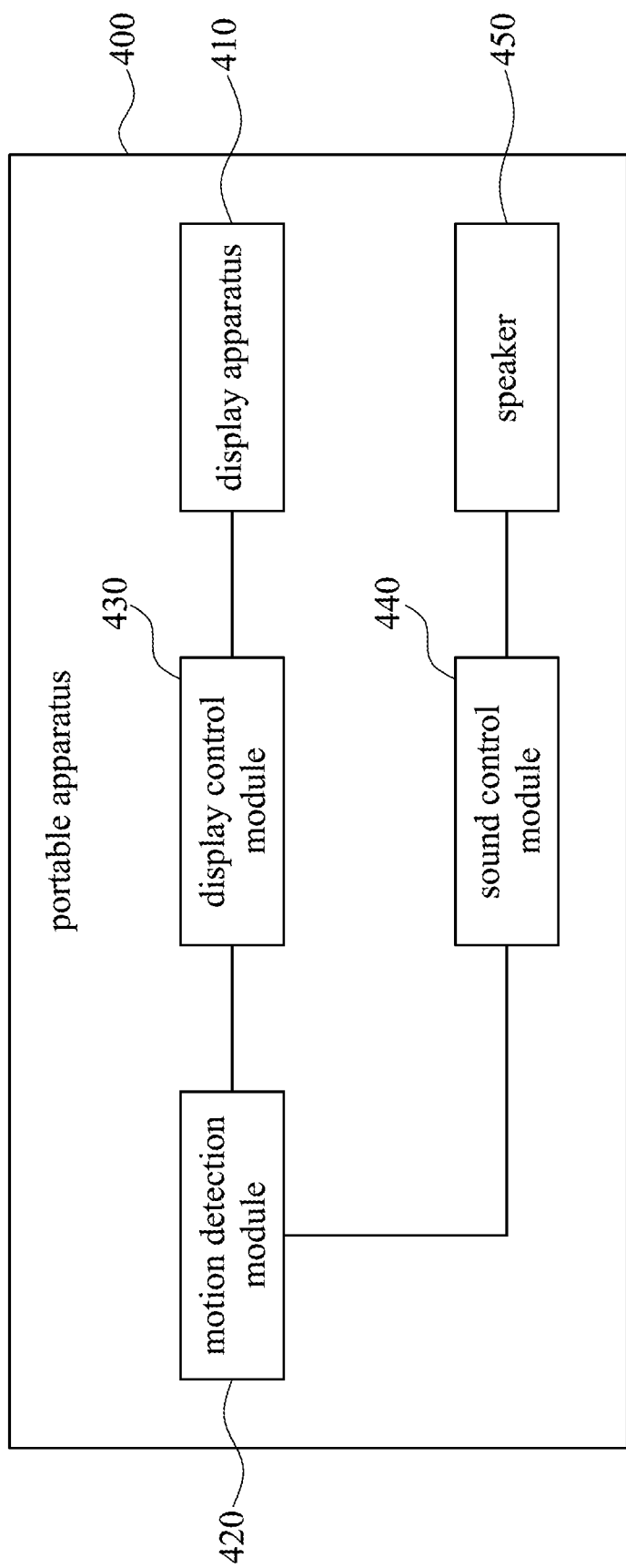
FIG. 8 is a block diagram of a portable apparatus in accordance with some embodiments of the present disclosure.

FIG. 8 illustrates a block diagram of the portable apparatus 400 in accordance with some embodiments of the present disclosure. As shown in FIG. 8, the portable apparatus 400 further includes a display control module 430. The display control module 430 is electrically connected to the motion detection module 420 and the display apparatus 410. The display control module 430 can produce electrical signals to control each subpixel in the display apparatus 410. For example, when the display apparatus 410 controls images by a thin film transistor (TFT) array substrate, the display control module 430 can produce electrical signals to several scan lines and data lines in the display apparatus 410, and thereby control electrical connection to the thin film transistor of any scan line and data line to control brightness and darkness of the subpixels (e.g., red subpixel, green subpixel or yellow subpixel) corresponding to the thin film transistor. When the motion detection module 420 detects motion of the real object O (see FIG. 2), an electrical signal is produced correspondingly and transmitted to the display control module 430. The electric signal is related to the trace of the motion of the real object O. The display control module 430 can control the real image RI (see FIG. 2) displayed by the display apparatus 410 by the electrical signal, and thereby controls the virtual image VI (as shown in FIG. 2) behind the curved mirror 100. By using such a method, the display control module 430 can change the real image RI displayed by the display apparatus 410 according to the motion of the detected real object O. Except the thin film transistor, the display apparatus 410 may control image generation using other devices, such as quantum-dot-based LEDs or other suitable technique, but the present disclosure is not limited in this regard.

In addition, in some embodiments, the portable apparatus 400 further includes a sound control module 440 and a speaker 450. The sound control module 440 is electrically connected to the motion detection module 420 and the speaker 450. The sound control module 440 may produce audio signals to control the speaker 450 to produce sounds. When the motion detection module 420 detects movement of the real object O (see FIG. 2), a corresponding audio signal is produced and transmitted to the speaker 450. The audio signal is related to the trace of the motion of the real object O. Therefore, the sound emitted by the speaker 450 or the change of the sound is induced by the movement of the real object O, such that the user can feel the experience of the sound of the speaker 450 interacting with the real object O. For example, when the user waves the real object O rapidly, the motion detection module 420 can detect the rapid moving trace of the motion and the sound control module 440 can then provide a corresponding audio signal to the speaker 450 to make the speaker 450 emit a sound related to such rapid motion according to the audio signal.

In some embodiments, the motion detection module 420 includes an image capture apparatus, for example, a complementary metal oxide semiconductor (CMOS) image capture device, a charge coupled device (CCD) image capture device, or another suitable device installed on the portable apparatus 400. Furthermore, in some embodiments, corresponding image analysis software can be installed in the portable apparatus 400 to analyze a trace of the motion of the real object O from the image captured by the CMOS or CCD or identify an appearance of the real object O. After identifying the appearance or the trace of the motion of the real object O, the portable apparatus 400 inputs the identified information into an application program for image display to trigger a corresponding interaction process. The application program generates a subsequent image according to the internal storage of the portable apparatus 400 or a data dictionary of a remote database, or obtains the subsequent image from the remote database to display so as to achieve an interaction with the user.

In some embodiments, the motion detection module 420 is positioned facing or facing away from the position of the curved mirror 100, or positioned on two surfaces which are facing and facing away from the curved mirror 100 simultaneously, such that the motion detection module 420 can detect a trace of motion of the real object O and combine an identifying software or hardware having function of facial identification, gesture identification, voice identification or other types of identification such that a body movement, a gesture, a facial expression, a voice or other behaviors of the user can be detected as well. After a keyword is identified according to the behaviors of the user, the keyword is input into the application program, a corresponding resource may be obtained by searching the keyword on internet, and a corresponding interactive content is generated or selected based on the search results and displayed on the portable apparatus 400. The interactive contents may include animations of characters which are stored in the portable apparatus 400, streamed from remote server, or generated in real-time. The displayed character may interact with the user based on scripts and perform scenarios such as games, shows, talks, presentations, or any type of interaction activities. The scripts include activities of the character and the requirements to trigger the following or responding activities. The activities include animations of the character and visual effects and corresponding audio. The scripts may also include random activities or decision making rules or processes, which may make the character more real or human-like.

For example, when the user speaks out a title of a song to be played, the portable apparatus 400 automatically searches the song and a corresponding image/video and then displays such image/video and song. In other embodiments, a virtual character in the image/animation can ask the user a question or ask the user to make a choice. The motion detection module 420 can identify a position of a face of the user and then input the position of the face into the application program. The application program adjusts a direction which the virtual character faces according to the position of the face of the user immediately. After virtual character asks the question or asks the user to make the choice, possible answers or selections may be displayed, such that the user can utilize the real object O or a body movement to aim at one of the answers or selections. The user may also make a gesture, speak out a desired selection or perform other suitable expressions to response the virtual character. The response of the user is detected and identified, and the result is input into the application program. After that, the application program begins to display image/video content related to the user's selection or generate a subsequent image/video content to be displayed.

In some embodiments, the mixed reality apparatus may be combined with connected Artificial Intelligence (AI) platforms to process natural languages. After the portable apparatus 400 receives a voice of the user, the voice is processed to identify the message and then transmitted to the cloud to be analyzed the meaning thereof. After response information is generated by the cloud, the response information is transmitted back to the portable apparatus 400. The response information includes image/video content corresponding to the voice received by the portable apparatus 400 which will be displayed by the portable apparatus 400, or image/video generation information corresponding to the voice where the portable apparatus 400 will utilize the image/video generation information to generate image/video content. As mentioned above, the application program on the portable apparatus can generate selections/answers and display an image/video to ask the user to make a choice. Rather than waiting for the user to operate, the application program combined with connected Artificial Intelligence (AI) platform can also actively provide options of conversation topics to the user. After the user select one of the topics, the application program combined with connected Artificial Intelligence (AI) platform displays a corresponding content or starts a conversation related to the topic with the user. The application program combined with connected Artificial Intelligence (AI) platform can actively search information related to the user, such as information from social networks, self-media or portable apparatus so as to generate options of conversation topics for a specific user. The audio content from connected Artificial Intelligence (AI) platform may be used for generating corresponding facial expression, such as mouth movement of the displayed character, so that the user can feel the character in the displayed image/video says the words. The tone and wording are adjusted to fit the character of the displayed image. Search results may be integrated or modified to form text-to-speech content to show to the user. The connected Artificial Intelligence (AI) platform generates the feedback message based on the recognized keyword and analyzed result of the user's message or request. The processing of connected Artificial Intelligence (AI) platform could be performed in remote server, wherein the application installed in portable apparatus 400 retrieves message or request from the user, sends them to the remote server, retrieves the feedback message generated by the server, and generates animation of the displayed character according to the feedback message. The feedback message may include online information or services possibly corresponding to the user's requests.

In some embodiments, the motion detection module 420 can detect a motion of the real object and the motion of the virtual image VI behind the curved mirror 100. For example, when the motion detection module 420 includes a CMOS, CCD or another image capture apparatus, the image analysis software installed in the portable apparatus 400 can not only analyze a trace of the motion of the real object O from the image captured by the CMOS or CCD but also analyze a position and/or trace of the motion of the virtual image VI as well. Therefore, the display control module 430 can control the real image RI displayed by the display apparatus 410 according to the motion of the real object O and the virtual image VI detected by the motion detection module 420, and thus produces more possible interaction applications. For example, as shown in the scenario in FIG. 3, when the motion detection module 420 detects and determines that the real object O overlaps hair of the virtual character in virtual image VI, the display control module 430 can modify the hair of the virtual character in the real image RI displayed by the display apparatus 410 (e.g., make the hair of the virtual character in the real image RI seem to be touched).

Furthermore, in some embodiments, when the motion detection module 420 includes a CMOS, CCD or another image capture apparatus, the image analysis software installed in the portable apparatus 400 can analyze a brightness of the virtual image VI by the image captured by the CMOS or CCD. The virtual image VI is formed by the real image RI which is displayed by the display apparatus 410, so the brightness of the virtual image VI depends on the brightness of the real image RI displayed by the display apparatus 410. Therefore, the portable apparatus 400 can change the brightness setting of the real image RI according to the brightness of the virtual image VI captured by the motion detection module 420, so the brightness of the virtual image VI is optimized automatically. Besides, different users may prefer different brightness settings and the portable apparatus 400 may detect identity of the current user and loads associated setting to application, so the images are displayed in proper settings to the specific user.

In some embodiments, the motion detection module 420 may include a wireless signal receiver, and the real object O has a wireless signal emitter. Therefore, the motion detection module 420 can determine a position and/or a trace of the motion of the real object O by the received wireless signal. For example, the motion detection module 420 may be a radio frequency identification (RFID) module, and the real object O can have an electrical label which can be identified by the RFID module so as to access information of the corresponding real object O. For example, the real object O is a physical product with an electrical label. After the motion detection module 420 identifies the electrical label, the portable apparatus 400 can connect to the internet and access information corresponding to the electrical label of the physical product, such as product specification, interaction video, image, or other product related information or contents, so the portable apparatus 400 can generate or display interacting contents associated to the real object O, such as image, video, or audio signals, or the portable apparatus 400 can initialize a game associated to the real object O. After the motion detection module 420 identifies the electrical label, the usage status of the real object O may also be retrieved. For example, if the real object O is not sold or rented, the display apparatus 410 can display corresponding options to the user, such as purchasing or renting the real object O. The user may decide whether to pay for the right to own or rent the real object O. The display apparatus 410 can also display introductions of additional contents corresponding to the real object O to the user, so the user can choose whether to download or pay for additional downloadable contents which is associated to the real object O.

In some embodiments, the display control module 430 and/or sound control module 440 can be realized by hardware, software or firmware. For example, the display control module 430 and the sound control module 440 can be integrated in a single application-specific integrated circuit (ASIC) or can be realized by different ASICs. Alternatively, the display control module 430 and/or sound control module 440 can be software or firmware installed in the portable apparatus 400.

Figure 9:
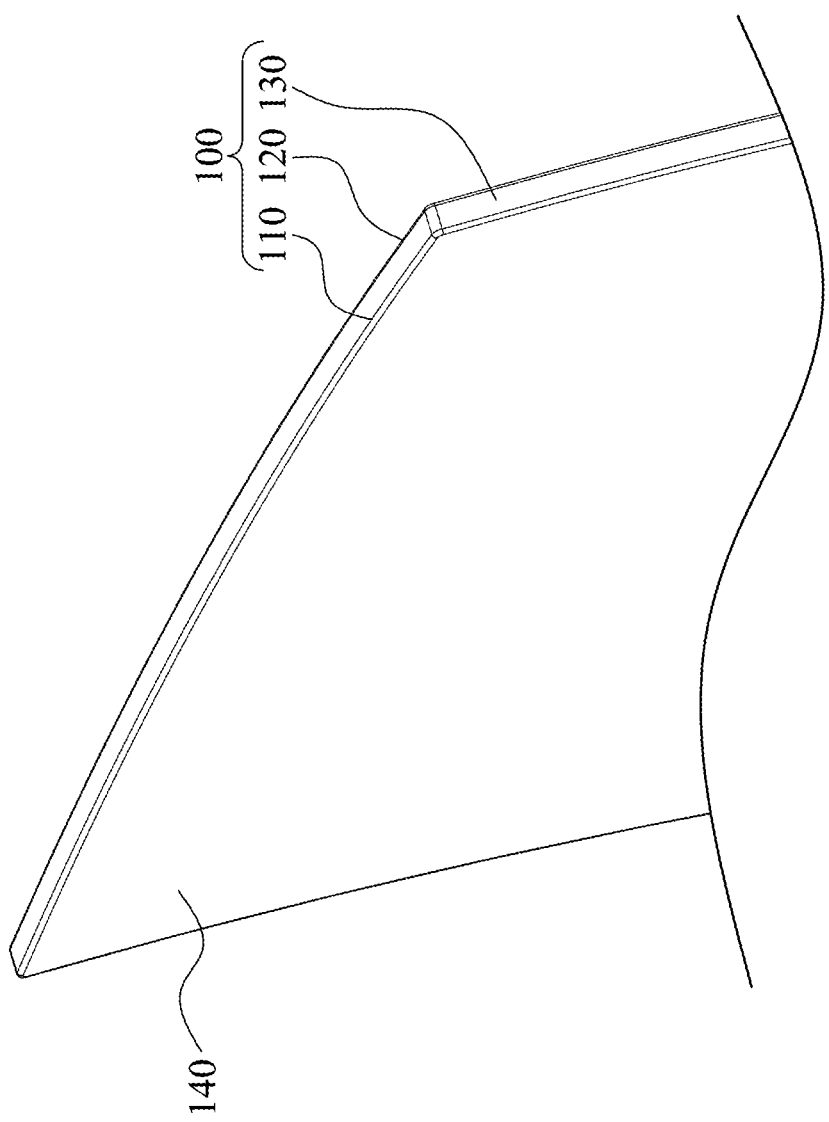
FIG. 9 is a fragmentary enlarged view of a curved mirror in accordance with some embodiments of the present disclosure.

FIG. 9 illustrates a fragmentary enlarged view of the curved mirror 100 in accordance with some embodiments of the present disclosure. As shown in FIG. 9, in some embodiments, the curved mirror 100 includes a light transmissive medium 130 between the concave surface 110 and the convex surface 120. The light transmissive medium 130 may include glass or polycarbonate (PC), but the present disclosure is not limited in this regard. The curved mirror 100 is light transmissive and thus can allow the user to view the virtual image behind the curved mirror 100 mixed with the real environment. In some embodiments, the mixed reality assembly further includes an optical film 140. The optical film 140 is disposed along the concave surface 110 of the curved mirror 100, for example, the optical film 140 is coated on the concave surface 110. That is to say, the main surface (that is, the surface having the greatest area) of the optical film 140 has a curvature that is substantially the same as that of the concave surface 110, which is beneficial to form the virtual image. The material of the optical film 140 is selected such that the transmittance and/or reflectance of the optical film 140 aids in the formation of more viewable virtual images. For example, the material of the optical film 140 can be any light transmissive material having a transmittance in a range from about 30% to about 60% or a reflection ratio from about 30% to about 70%. In particular, the material of the optical film 140 may be any light transmissive material having a transmittance in a range from about 35% to about 45% or a reflectance ratio in a range from about 40% to about 60%. In some embodiments, the transmittance and/or the reflectance ratio of the optical film 140 is changeable, so that the user can adjust the transmittance and/or reflectance ratio of the optical film 140 according to the actual visual feel behind the curved mirror 100, and therefore the virtual image is visually optimized for the user. For example, in some embodiments, the transmittance and/or reflectance ratio of the optical film 140 can be adjusted by a current applied to the optical film 140.

Referring back to FIG. 1, in some embodiments, the mixed reality assembly further includes a first holder 210, a second holder 220 and a base 300. The first holder 210 and the second holder 220 are disposed on the base 300. The first holder 210 is configured to support the portable apparatus 400. Therefore, the first holder 210 is in front of the concave surface 110 of the curved mirror 100 and within the focal length of the curved mirror 100, so that the portable apparatus 400 supported by the first holder 210 can form an enlarged virtual image behind the curved mirror 100. The second holder 220 is configured to support curved mirror 100, and thus a distance between the second holder 220 and the first holder 210 is not greater than the focal length of the curved mirror 100, so that the portable apparatus 400 can form an enlarged virtual image behind the curved mirror 100 supported by the second holder 220. For example, when the focal length of the adopted curved mirror 100 is not greater than 60 cm, and the distance between the first holder 210 and the second holder 220 is in a range from about 20 cm to about 50 cm.

Figure 10:
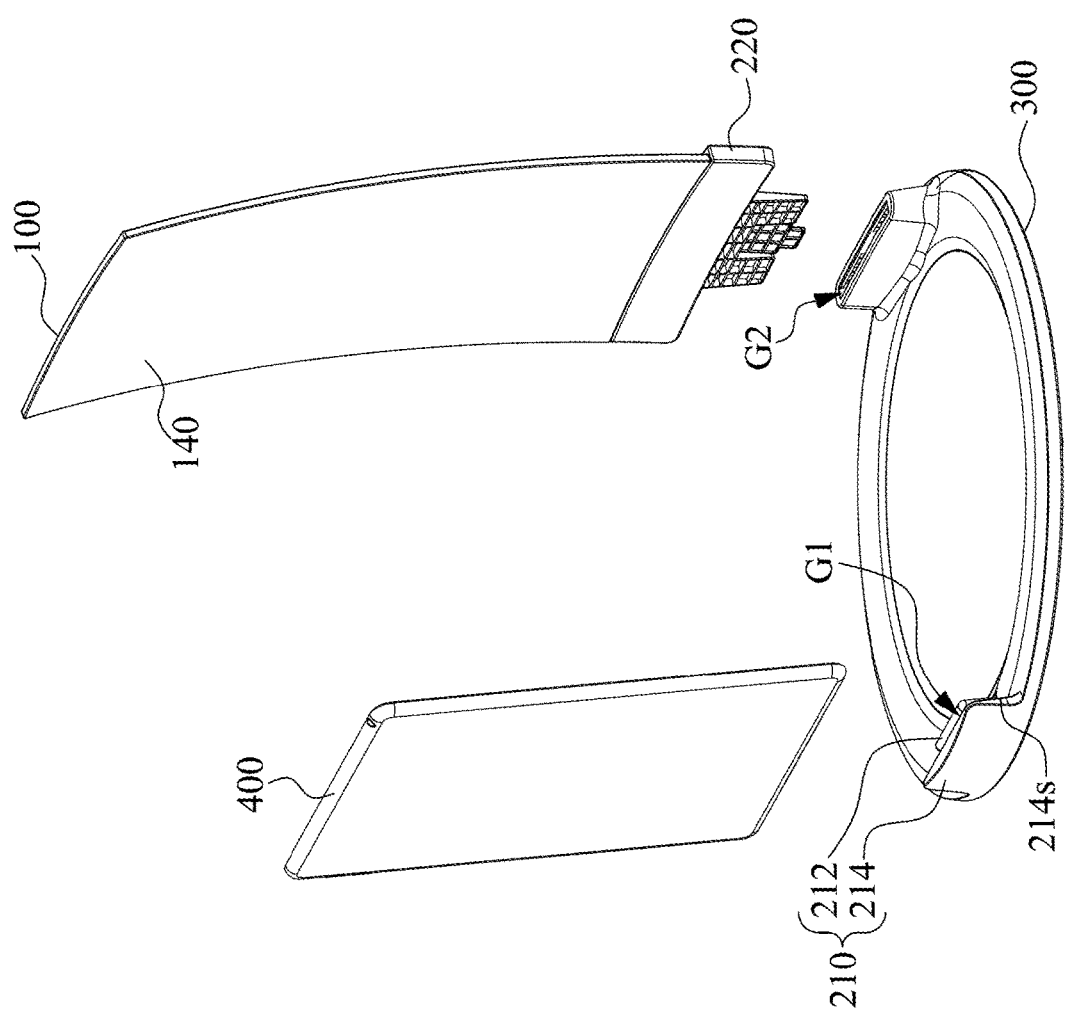
FIG. 10 is an exemplary view of a curved mirror and a portable apparatus separated from a holder in accordance with some embodiments of the present disclosure.

In some embodiments, the portable apparatus 400 is arranged demountably with the first holder 210. Therefore, as shown in FIG. 10, the portable apparatus 400 can be separated from the first holder 210. In particular, the first holder 210 may include a front railing 212 and a back railing 214. The front railing 212 is closer to the curved mirror 100 than the back railing 214. The front railing 212 and the back railing 214 define a first slot G1 therebetween. When the portable apparatus 400 is placed on the first holder 210, the portable apparatus 400 can be inserted into the first slot G1 and constrained by the front railing 212 and the back railing 214. Furthermore, the portable apparatus 400 can be extracted from the first slot G1, so that the portable apparatus 400 is released from constraint by the front railing 212 and the back railing 214 and can be carried away by the user.

Furthermore, in some embodiments, the second holder 220 is arranged demountably with the base 300. Therefore, as shown in FIG. 10, the second holder 220 can separate from the base 300. For example, the base 300 has a second slot G2. The second holder 220 can be inserted into the second slot G2 of the base 300 and be constrained by the base 300. Furthermore, the second holder 220 can be extracted from the second slot G2 and released from the constraint of base 300.

In some embodiments, the back railing 214 of the first holder 210 has a support surface 214s. The support surface 214s is configured to support the back of the portable apparatus 400. As shown in FIG. 10, the support surface 214s inclines relative to the base 300, so that the support surface 214s can face the curved mirror 100. As a result, when the portable apparatus 400 is supported on the support surface 214s, the display apparatus 410 of the portable apparatus 400 can display an image toward the curved mirror 100. As a result, the user facing the curved mirror 100 can see that the virtual image of the image displayed by the portable apparatus 400 is shown on the curved mirror 100. A length, a width, and a size of the curved mirror 100 are determined based on the requirements of the mixed reality assembly. In some embodiments, the curved mirror 100 has a long side and a short side and both sides can be fixed on the second holder 220 alternatively. When the portable apparatus is placed horizontally on the first holder 210, the long side of the curved mirror 100 is set in horizontal direction and is fixed on the second holder 220. When the portable apparatus is placed vertically on the first holder 210, the long side of the curved mirror 100 is set in vertical direction and is fixed on the second holder 220.

In some embodiments, the mixed reality assembly has an improved viewing area. When the portable apparatus 400 is fixed on the first holder 210, the view of the user at the improved viewing area is not sheltered or blocked, so the user can see the virtual image on the curved mirror 100 fully and clearly. The display surface of the portable apparatus 400 and the curved mirror 100 face each other with a certain angle, such that the curved mirror 100 can reflect the generated virtual image to the user at the improved viewing area. In some embodiments, the portable apparatus 400 and the first holder 210 have an angle of elevation in a range from about 60 degrees to about 100 degrees. A bottom of the curved mirror 100 and the second holder 220 maintain an angle of elevation in a range from about 60 degrees to about 100 degrees. In some embodiments, the first holder 210 makes the portable apparatus 400 fixed at a height as measured from the table be in a range from about 50 mm to about 200 mm. The second holder 220 fixes the curved mirror 100 at a suitable height as measured from the table, which is related to the projection distance and an angle from the portable apparatus 400 to the curved mirror 100, may be in a range from about 55 mm to about 400 mm, for example, such that the inclined curved mirror 100 can directly face the inclined portable apparatus 400. Therefore, when the user views the virtual image shown on the curved mirror 100, the user may feel that the virtual image is positioned just on the table or very close to the table rather than floats in air or sinks below the table. As a result, the user can have an improved real visual experience. In some embodiments, the application of the portable apparatus 400 can adjust a position of the image displayed on the screen, so the user at the improved viewing area can see the virtual image generated by the curved mirror 100 at proper position with proper height and size. In particular, the application can be set to mirror image displayed by the portable apparatus 400, i.e. the displayed image has opposite left and right. As a result, the virtual image viewed by the user does not have opposite left and right caused by mirroring.

Figure 11:
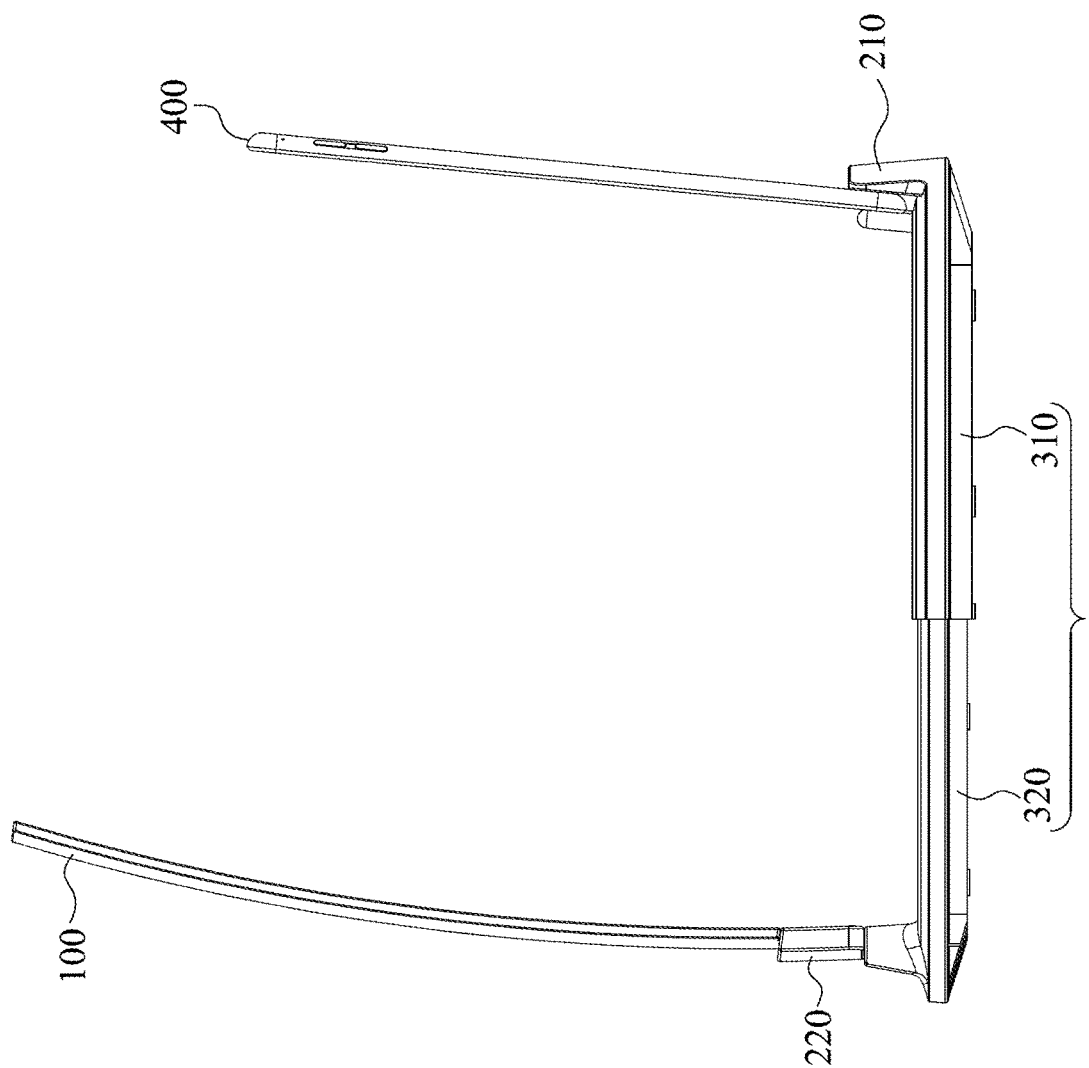
FIGS. 11 and 12 are side views of the mixed reality assembly in accordance with some embodiments of the present disclosure.

FIG. 11 illustrates a side view of the mixed reality assembly in some embodiments of the present disclosure. As shown in FIG. 11, the main difference between the present embodiment and the above-mentioned embodiment is that the base 300a of the present embodiment is stretchable so the length of the base 300a is adjustable dynamically. Through such dynamic adjustment of the base 300a, the distance between the curved mirror 100 and the first holder 210, and the distance between the curved mirror 100 and the portable apparatus 400 supported by the first holder 210 can be adjusted. Since the distance between the portable apparatus 400 and the curved mirror 100 can affect the size of the virtual image behind the curved mirror 100, the user can achieve the desired size of the virtual image by dynamically adjusting the base 300a. For example, the base 300a may include a first portion 310 and a second portion 320. The second portion 320 can slidably couple to the first portion 310, and therefore, the user can pull the first portion 310 and/or the second portion 320 outward to elongate the base 300a to increase the size of the virtual image, or push the first portion 310 and/or the second portion 320 inward to shorten the base 300a to reduce the size of the virtual image.

Figure 12:
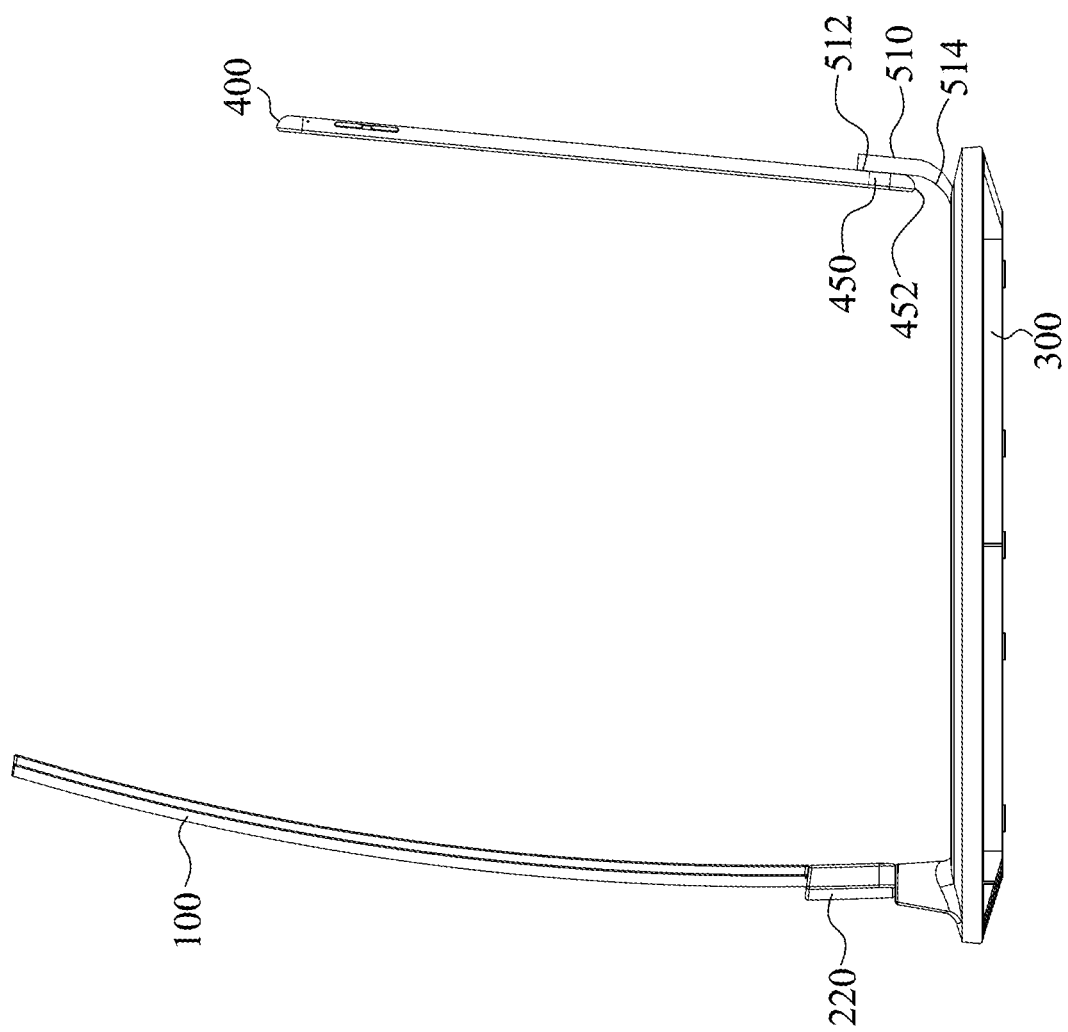

FIG. 12 illustrates a side view of the mixed reality assembly according to some embodiments of the present disclosure. As shown in FIG. 12, the main difference between the present embodiment and the above-mentioned embodiments is that the first holder 510 supporting the portable apparatus 400 is different from the above-mentioned first holder 210. In particular, the first holder 510 has a support surface 512 and a curved surface 514 extending from the support surface 512 downward to the base 300. The support surface 512 touches and supports the portable apparatus 400. The curved surface 514 is separated from the portable apparatus 400 and is below a speaker opening 452 of the speaker 450 of the portable apparatus 400. When the speaker 450 emits sound through the speaker opening 452, the curved surface 514 of the first holder 510 can reflect the sound wave toward the curved mirror 100, and then the curved mirror 100 can reflect the sound wave reflected from the first holder 510 to the user. In this way, the user will feel that the sound heard is from the curved mirror 100. Therefore, the mixed reality assembly of the present embodiment not only allows the user to view the virtual image behind the curved mirror 100, but also allows the user to hear sound from the curved mirror 100, thereby providing a full interaction experience for the user.

Figure 13:
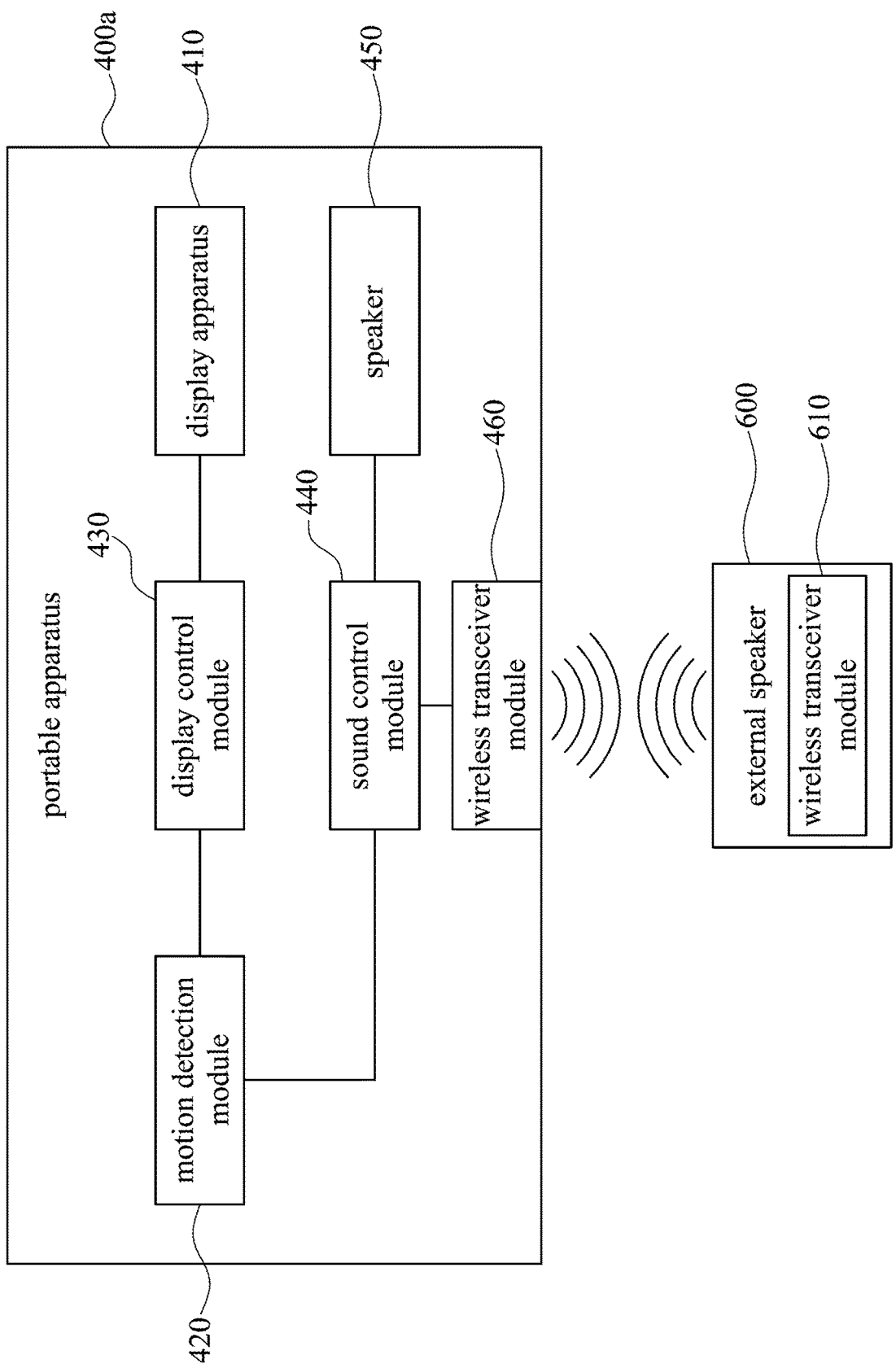
FIG. 13 is a block diagram of the mixed reality assembly in accordance with some embodiments of the present disclosure.

FIG. 13 illustrates a block diagram of the mixed reality assembly in accordance with some embodiments of the present disclosure. As shown in FIG. 13, the main difference between the present embodiment and the above-mentioned embodiment is that the present embodiment further includes an external speaker 600. The external speaker 600 is separated from the portable apparatus 400a and is wirelessly connected to the portable apparatus 400a. Therefore, the external speaker 600 can be disposed beside the curved mirror 100, so that the user can feel that the sound is from the curved mirror 100. For example, with reference to FIG. 14, the external speaker 600 may be placed below the curved mirror 100 and separated from the first holder 510 and the portable apparatus 400a supported by the first holder 510. A speaker opening 602 of the external speaker 600 can emit sound toward the portable apparatus 400a, so that when the user is positioned behind the portable apparatus 400a, he or she feels that the sound comes from below the curved mirror 100, and therefore a more interesting interaction experience is provided to the user.

In some embodiments, as shown in FIG. 13, the portable apparatus 400a and the external speaker 600 include wireless transceiver modules 460 and 610, respectively. The wireless transceiver modules 460 and 610 can be wirelessly connected. For example, the wireless transceiver modules 460 and 610 can be Bluetooth modules to transfer wireless signals utilizing the BT frequency band to realize signal transmission. Therefore, when the image displayed by the portable apparatus 400a changes, for example, the image moves or makes an action, the user may see that the virtual image displayed by the curved mirror 100 changes. At the same time, the portable apparatus 400a may produce corresponding audio signal and transmit the same to the external speaker 600. The external speaker 600 receives the audio signal from the portable apparatus 400a and then broadcasts, such that the user can hear the sound corresponding to the virtual image simultaneously. In some embodiments, when the motion detection module 420 detects movement of the real object O (see FIG. 2), the sound control module 440 can generate a corresponding audio signal and transmit the same to the wireless transceiver module 610 of the external speaker 600 through the wireless transceiver module 460, such that the external speaker 600 can emit sound corresponding to the movement of the real object O simultaneously.

In some embodiments, the speaker 450 of the portable apparatus 400a or the external speaker 600 can emit sound corresponding to the movement to the real object O. The sound of the speaker 450 can be reflected to the curved mirror 100 through the curved surface 514, and then reflected to the user by the curved mirror 100. The user can feel that the sound is heard from the position of the external speaker 600 below the curved mirror 100 or can feel that the sound is heard from the curved mirror 100. In other embodiments, when the external speaker 600 emits sound, the speaker 450 of the portable apparatus 400a may be kept silent, or the speaker 450 emits sounds of additional sound channel to produce stereo sound effect. Whether to emit the sound from the speaker 450 and the external speaker 600 is controlled by the sound control module 440.

Figure 16:
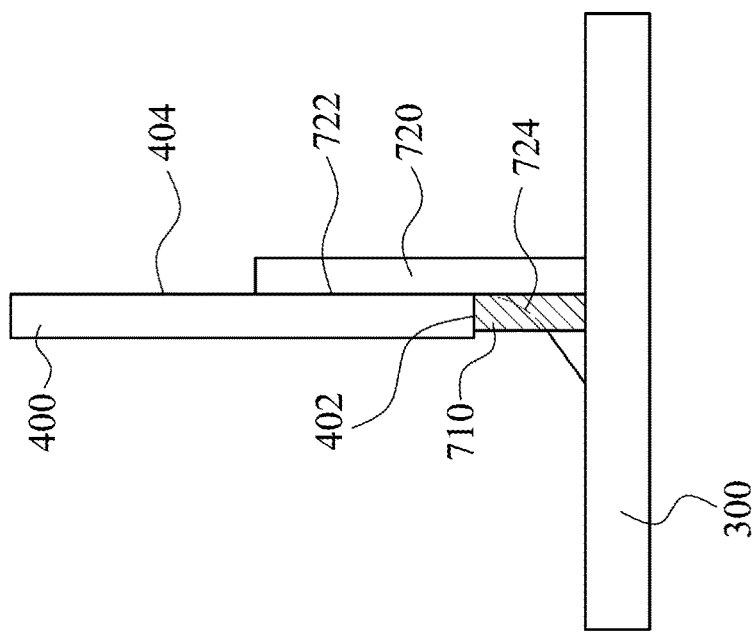
FIGS. 15 and 16 are side views from different orientations of the mixed reality assembly in accordance with some embodiments of the present disclosure.
Figure 15:
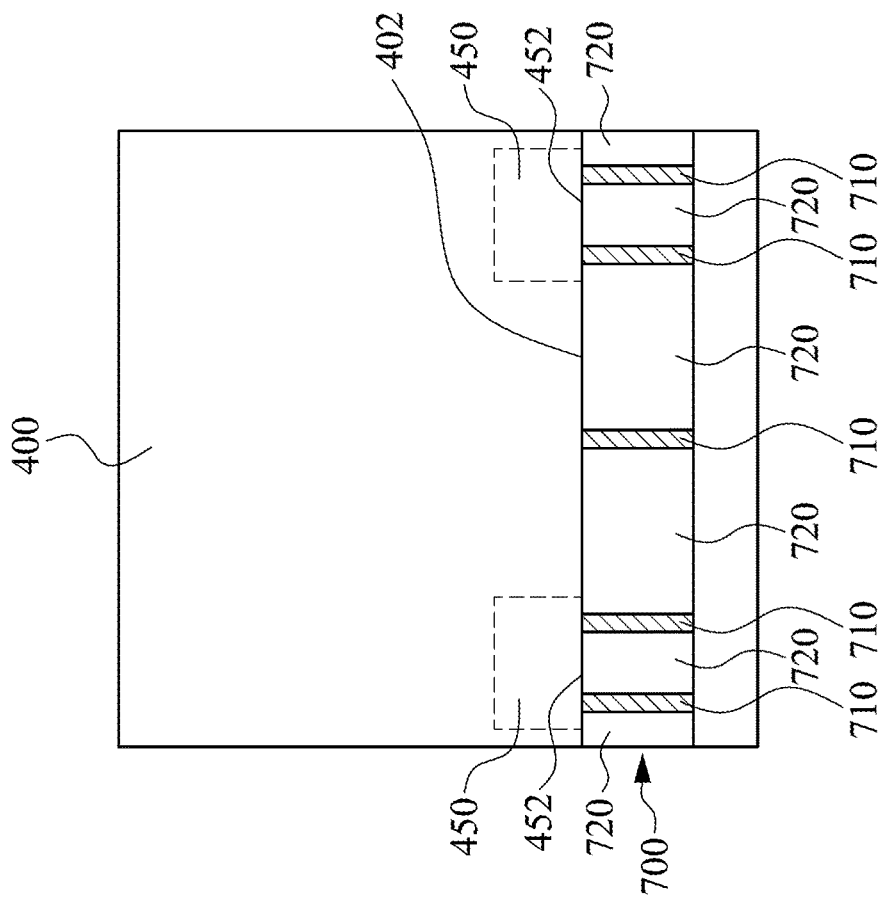

FIGS. 15 and 16 illustrate side views of the mixed reality assembly from different orientations in accordance with some embodiments of the present disclosure. The main difference between the present disclosure and the above-mentioned embodiments is that the first holder 700 supporting the portable apparatus 400 is different from the above-mentioned first holders 210 and 510. In particular, the first holder 700 includes a plurality of separators 710 separated from each other. The separators 710 are configured to support a bottom surface 402 of the portable apparatus 400. Furthermore, the speaker openings 452 disposed on the bottom surface 402 of the portable apparatus 400 are at least partially not shielded by the separators 710. By using such a configuration, the sound from the portable apparatus 400 is not blocked by the first holder 700 and passes through the space between the separators 710.

In some embodiments, at least one of the separators 710 is disposed between the two speaker openings 452 of the portable apparatus 400, so that the separator 710 can prevent the sound from the two speaker openings 452 from interfering with each other. Furthermore, in some embodiments, the first holder 700 further includes a back railing 720. A support surface 722 of the back railing 720 is configured to support a back 404 of the portable apparatus 400. The separators 710 protrude from the back railing 720 at intervals. Therefore, the bottom surface 402 and the back surface 404 of the portable apparatus 400 can be supported by the separators 710 and the back railing 720, respectively. In some embodiments, the back railing 720 includes a curved surface 724. The curved surface 724 is positioned below the bottom surface 402 of the portable apparatus 400 to reflect sounds toward the curved mirror 100 (see FIG. 14).

In some embodiments, the back railing 720 is disposed behind the portable apparatus 400 and the separators 710 are disposed under the portable apparatus, so the back railing 720 is farther away from the curved mirror (see curved mirror 100 in FIG. 14) than the separators 710 being. In some embodiments, a top of the back railing 720 is higher than tops of the separators 710 such that the back railing 720 and the separators 710 abut the rear surface and the bottom surface of the portable apparatus, respectively.

Figure 18:
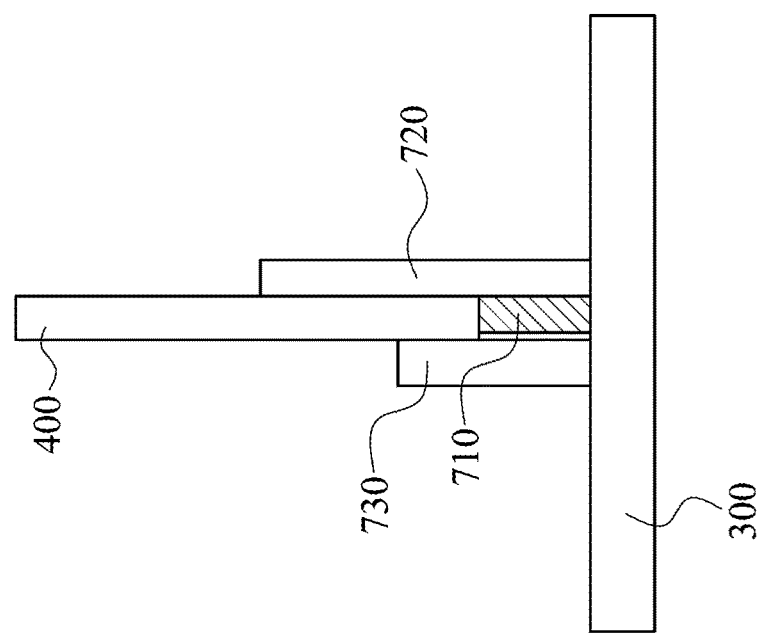
FIGS. 17 and 18 are side views from different orientations of the mixed reality assemblies in accordance with some embodiments of the present disclosure.
Figure 17:
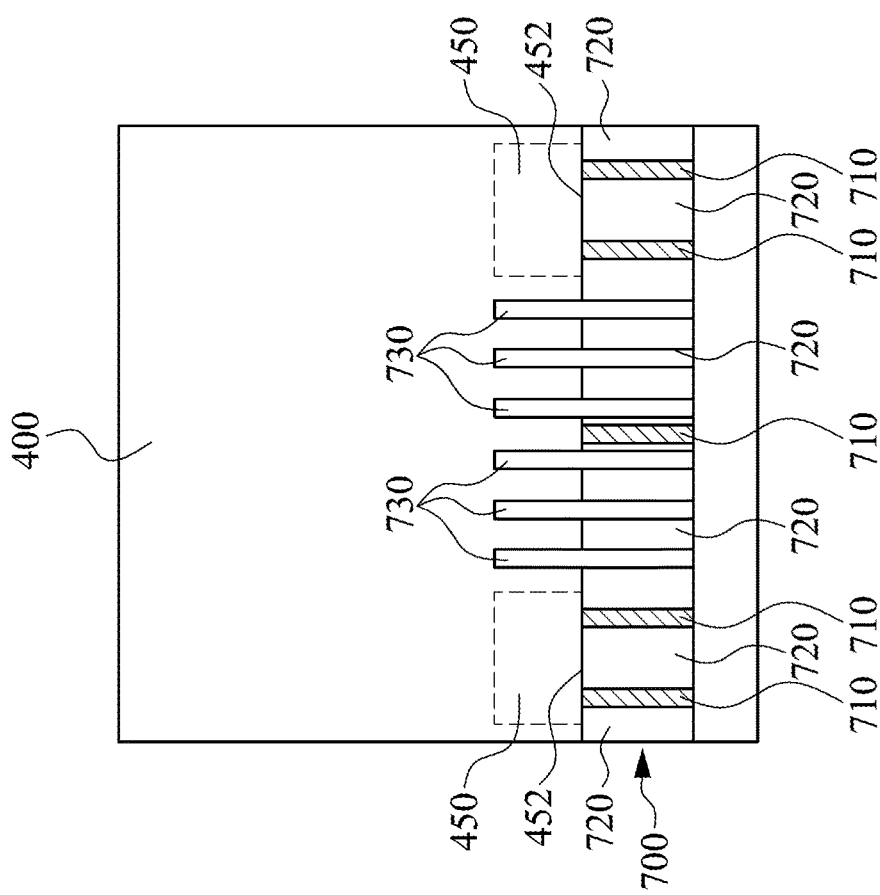

FIGS. 17 and 18 illustrate side views from different orientations of the mixed reality assembly in accordance with some embodiments of the present disclosure. The main difference between this embodiment and the embodiments shown in FIGS. 15 and 16 is that the first holder 700 further includes a plurality of front railings 730. The front railings 730 are arranged at intervals in front of the back railing 720. The front railings 730 and the back railings 720 can firmly hold the portable apparatus 400 therebetween. The front railing 730 is disposed in front of the portable apparatus 400 and the separators 710 are disposed under the portable apparatus 400, so the front railing 730 is closer to the curved mirror (see the curved mirror 100 in FIG. 14) than the separators 710 being. In some embodiments, a top of the front railing 730 is higher than tops of the separators 710 such that the front railing 730 and the separators 710 abut the front surface and the bottom surface of the portable apparatus 400, respectively.

Figure 19:
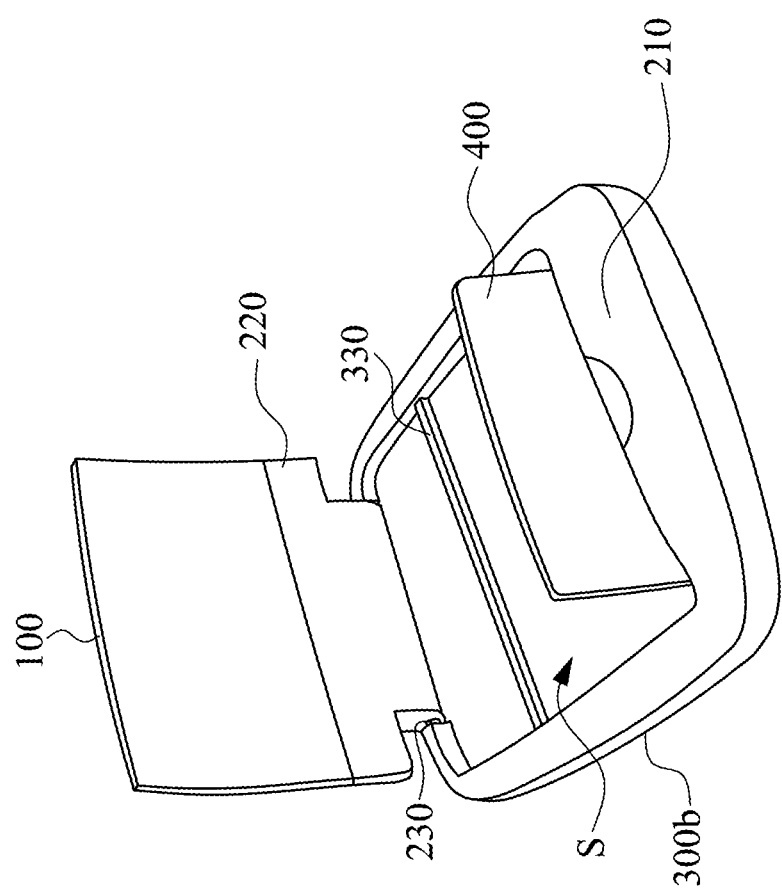
FIGS. 19 and 20 are perspective views of the mixed reality assembly in accordance with some embodiments of the present disclosure.
Figure 20:
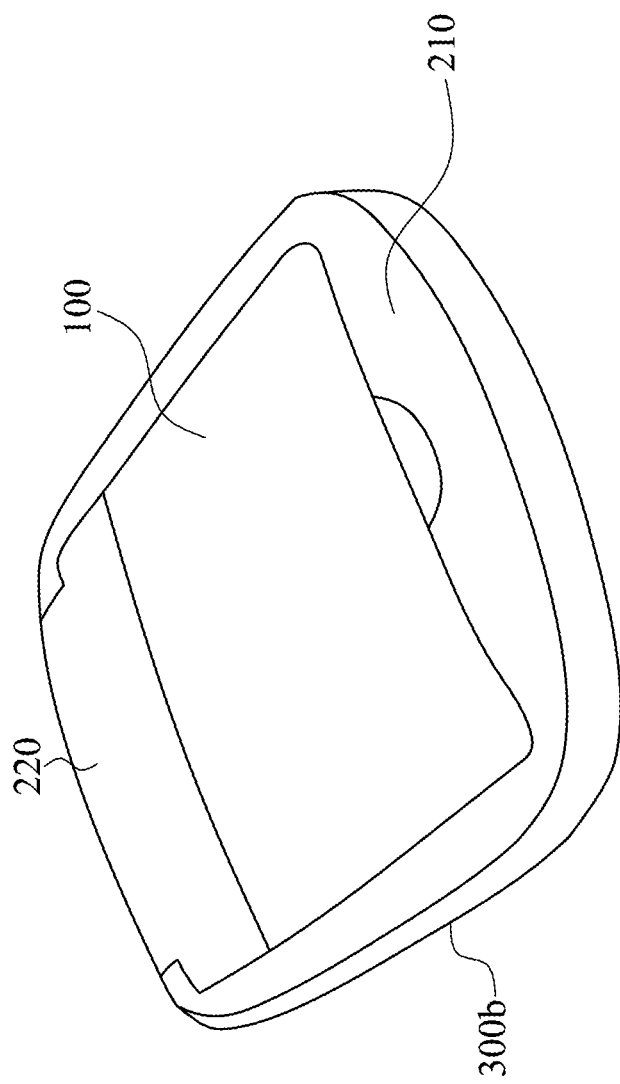

FIGS. 19 and 20 are perspective views of the mixed reality assembly according to some embodiments of the present disclosure. As shown in FIGS. 19 and 20, the main difference between the present embodiment and the above-mentioned embodiment is that the curved mirror 100 of the present embodiment is rotatable. For example, the mixed reality assembly can include a hinge 230 connected to the second holder 220 and the base 300b such that the second holder 220 is pivotally connected to the base 300b and can rotate relative to the base 300b. That is to say, an angle of the second holder 220 relative to the horizontal surface can be changed. Therefore, the curved mirror 100 constrained by the second holder 220 can rotate relative to the second holder 220. The rotatability of the curved mirror 100 can bring about at least two advantages. One advantage is that the rotation of the curved mirror 100 can change or adjust a height of the virtual image behind the curved mirror 100, such that the user can obtain a desired position of the virtual image by rotating the curved mirror 100. Another advantage is that the curved mirror 100 can rotate to lie on the base 300b (as shown in FIG. 20) to increase the portability of the mixed reality assembly. Furthermore, when the curved mirror 100 lies on the base 300b, the portable apparatus 400 can be stored below the curved mirror 100. For example, the base 300b has a storage space S, which has a depth greater than a thickness of the portable apparatus 400. That is to say, the depth of the storage space S is greater than the thickness of the typical smartphone or tablet. Therefore, when the curved mirror 100 lies on the base 300b, the portable apparatus 400 can be stored in the storage space S of the base 300b and will not touch the curved mirror 100.

In some embodiments, the base 300b has a protruding rib 330 between the first holder 210 and the second holder 220. The protruding rib 330 can protrude from a bottom surface of the storage space S of the base 300b. When the curved mirror 100 rotates to lie on the base 300b, the second holder 220 can contact the protruding rib 330 of the base 300b and be supported by the protruding rib 330. Therefore, the protruding rib 330 can prevent the second holder 220 from continuing to rotate downward and thereby avoid a rotation angle of the hinge 230 from exceeding an allowable range which could ultimately result in the hinge 230 breaking. In some embodiments, the distance between the first holder 210 and the second holder 220 is not less than (that is, greater than or equal to) the sum of the height of the curved mirror 100 and the height the second holder 220. Therefore, when the curved mirror 100 lies on the base 300b, the curved mirror 100 does not touch the first holder 210. In some embodiments, the base 300b further includes a clasping structure (not shown) configured to lock the curved mirror 100 when the curved mirror 100 lies on the base 300b.

Figure 21:
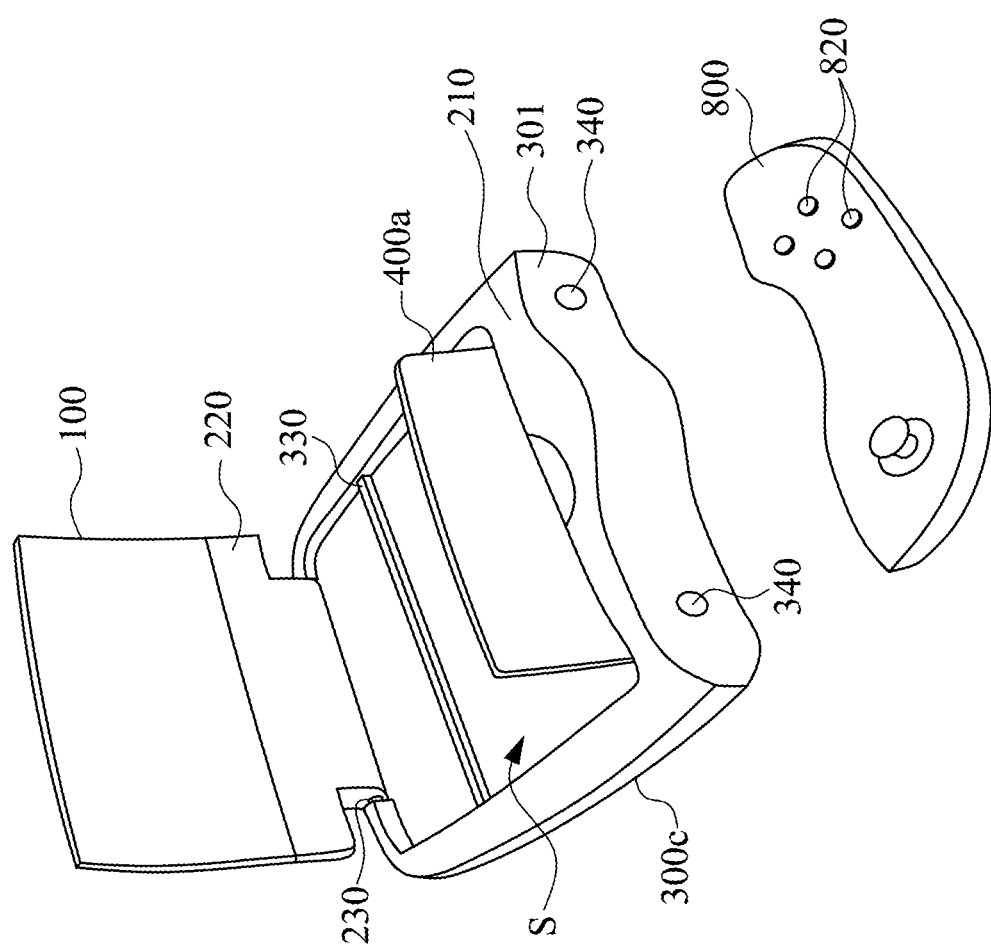
FIGS. 21 and 22 are perspective views of the mixed reality assembly in accordance with some embodiments of the present disclosure.
Figure 22:
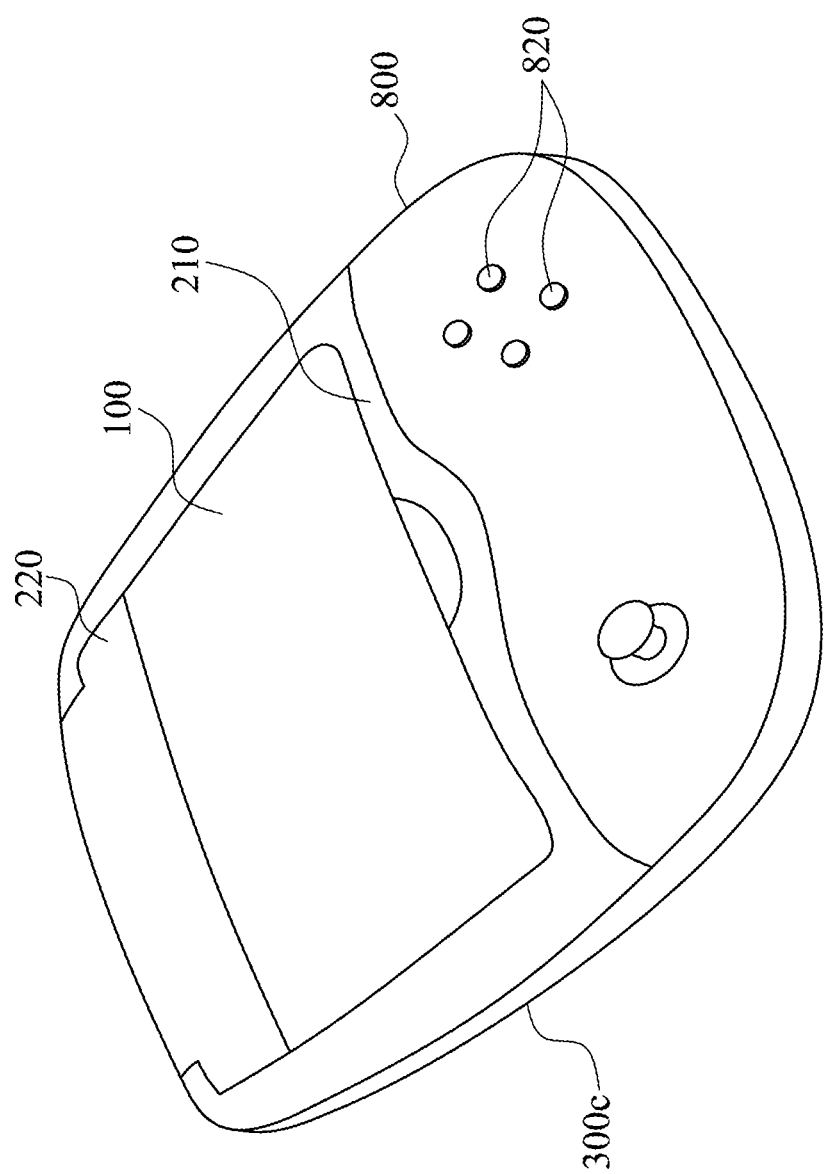

FIGS. 21 and 22 illustrate perspective views of the mixed reality assembly according to some embodiments of the present disclosure. As shown in FIGS. 21 and 22, the main difference between present embodiment and the above-mentioned embodiments is that the mixed reality assembly of the present embodiment further includes a wireless controller 800. The wireless controller 800 is arranged demountably with the base 300c. For example, the base 300c can include a hook 340 on a lateral surface 301 of the base 300c. The hook 340 can latch onto a slot (not shown) of the wireless controller 800 to fix together the base 300c and the wireless controller 800. The wireless controller 800 can control the real image RI (see FIG. 2) displayed by the portable apparatus 400a via wireless communication to control the virtual image VI (see FIG. 3) behind the curved mirror 100.

Figure 23:
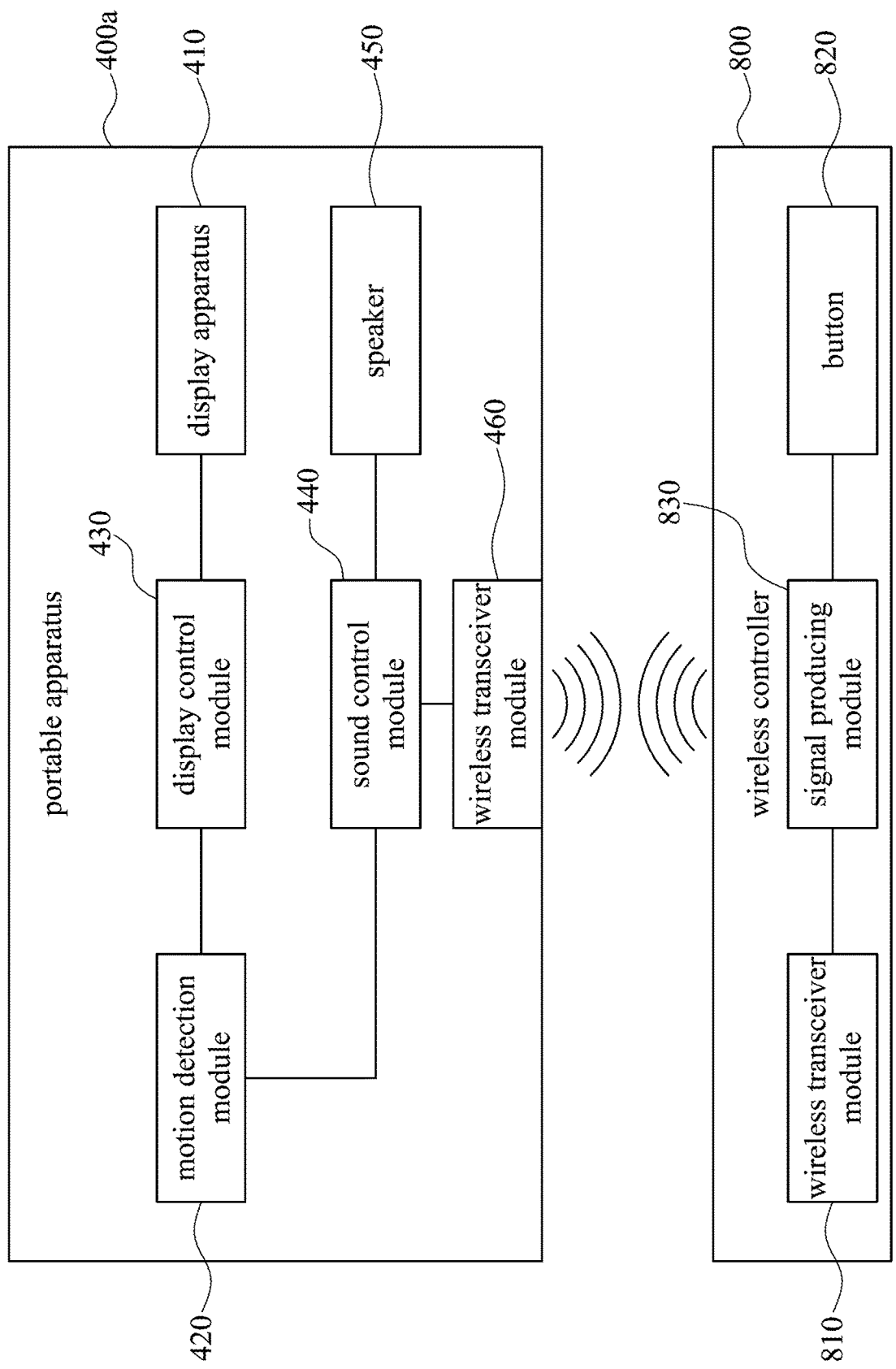
FIG. 23 is a block diagram of the portable apparatus in accordance with some embodiments of the present disclosure.

For example, as shown in the block diagram of FIG. 23, the portable apparatus 400a and the wireless controller 800 include wireless transceiver modules 460 and 810, respectively. The wireless transceiver modules 460 and 810 can be wirelessly connected. For example, the wireless transceiver modules 460 and 810 can be Bluetooth modules to realize signal transmission using wireless signals in the BT frequency band. The wireless controller 800 further includes a button 820 and a signal producing module 830 electrically connected to the button 820 and the wireless transceiver module 810. Therefore, when the user presses the button 820 and induces the signal producing module 830 to produce corresponding control signals, the wireless transceiver module 810 can transmit the control signals to the wireless transceiver module 460 of the portable apparatus 400a. As a result, the display control module 430 and the sound control module 440 of the portable apparatus 400a can respectively control the real image RI displayed by the display apparatus 410 and the sound output by the speaker 450 according to the control signals. The virtual image VI behind the curved mirror 100 changes according to the real image RI displayed by the display apparatus 410, such that when the user changes the real image RI by the wireless controller 800, the virtual image VI will change as well. Therefore, the user will have the experience that the virtual image VI is controllable with the wireless controller 800. In some embodiments, the signal producing module 830 can be realized by hardware, software and/or firmware.

Figure 24:
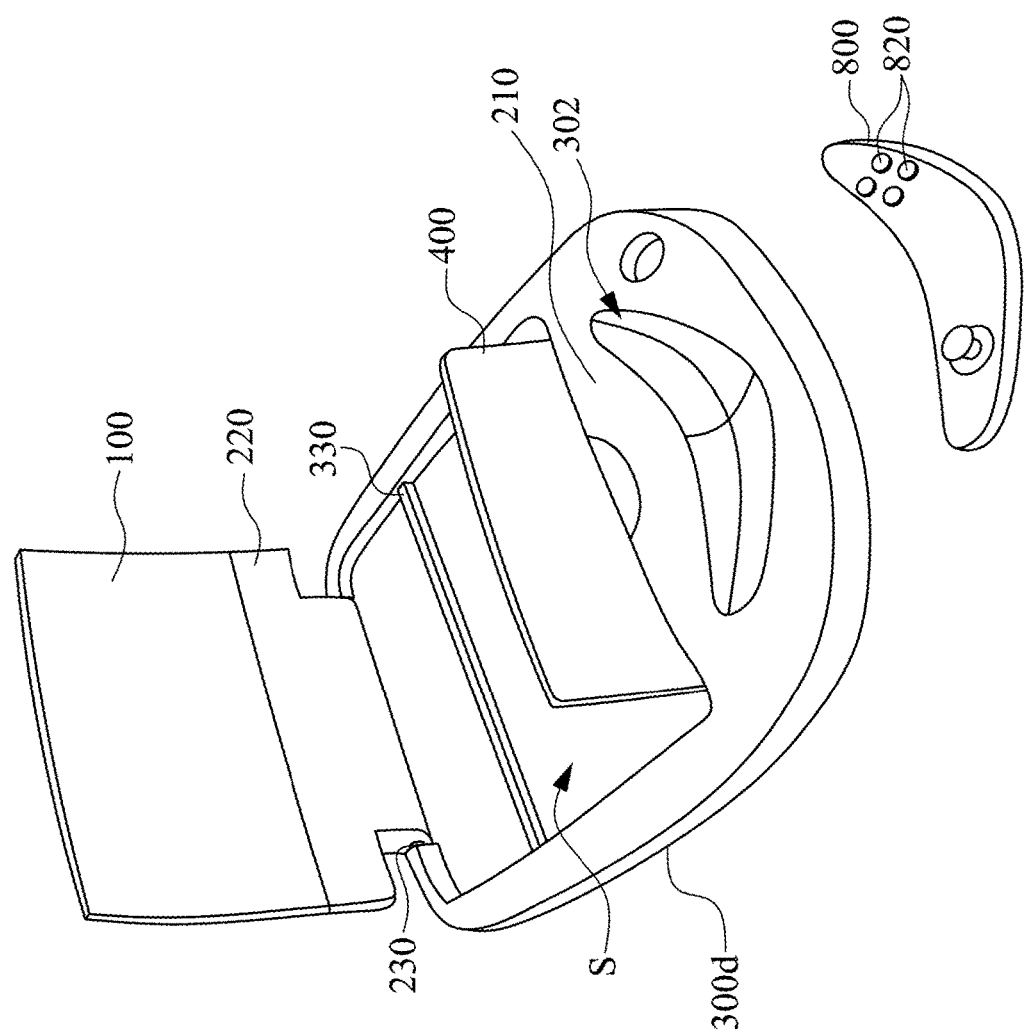
FIGS. 24 and 25 are perspective views of the mixed reality assembly in accordance with some embodiments of the present disclosure.
Figure 25:
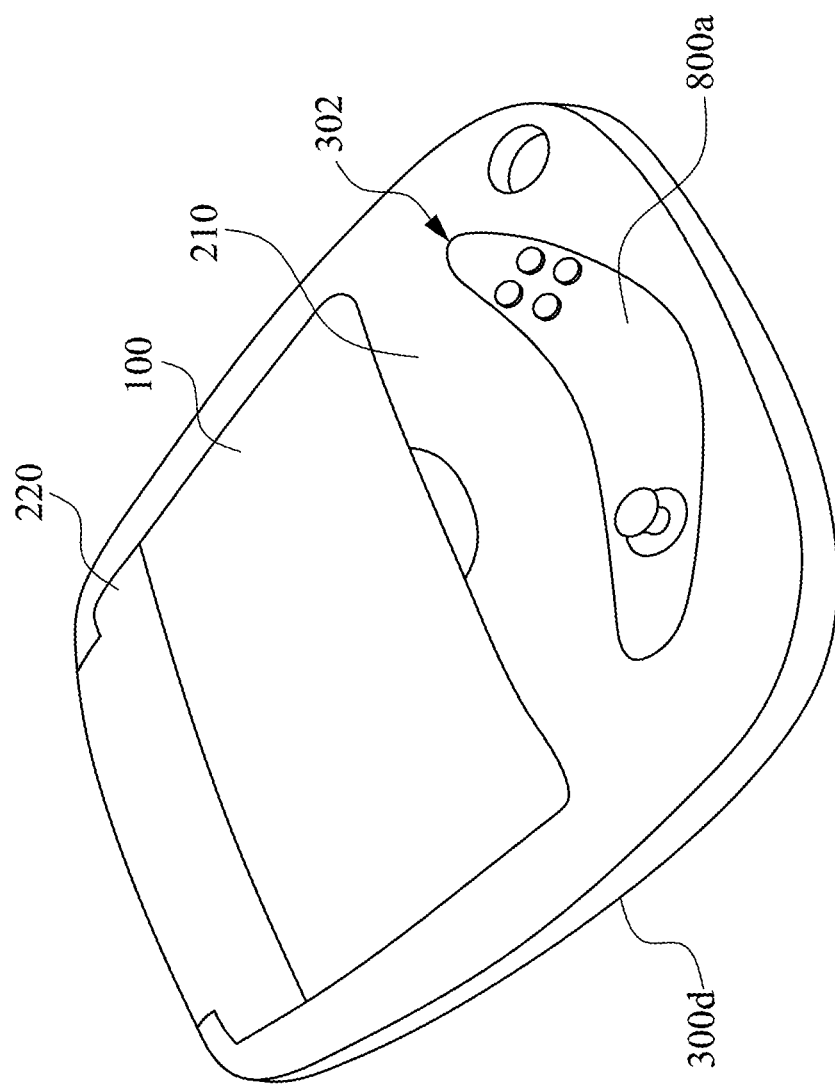

FIGS. 24 and 25 are perspective views of the mixed reality assembly according to some embodiments of the present disclosure. As shown in FIGS. 24 and 25, the main difference between the present embodiment and the embodiments of FIGS. 21 and 22 is that configurations of the wireless controller 800a and the base 300d are different from those of the above-mentioned embodiment. In particular, as shown in FIGS. 24 and 25, the base 300d has a controller storage slot 302 on a top surface of the base 300d. A size and a shape of the controller storage slot 302 match the wireless controller 800a, such that the wireless controller 800a can be stored in the controller storage slot 302.

Figure 26:
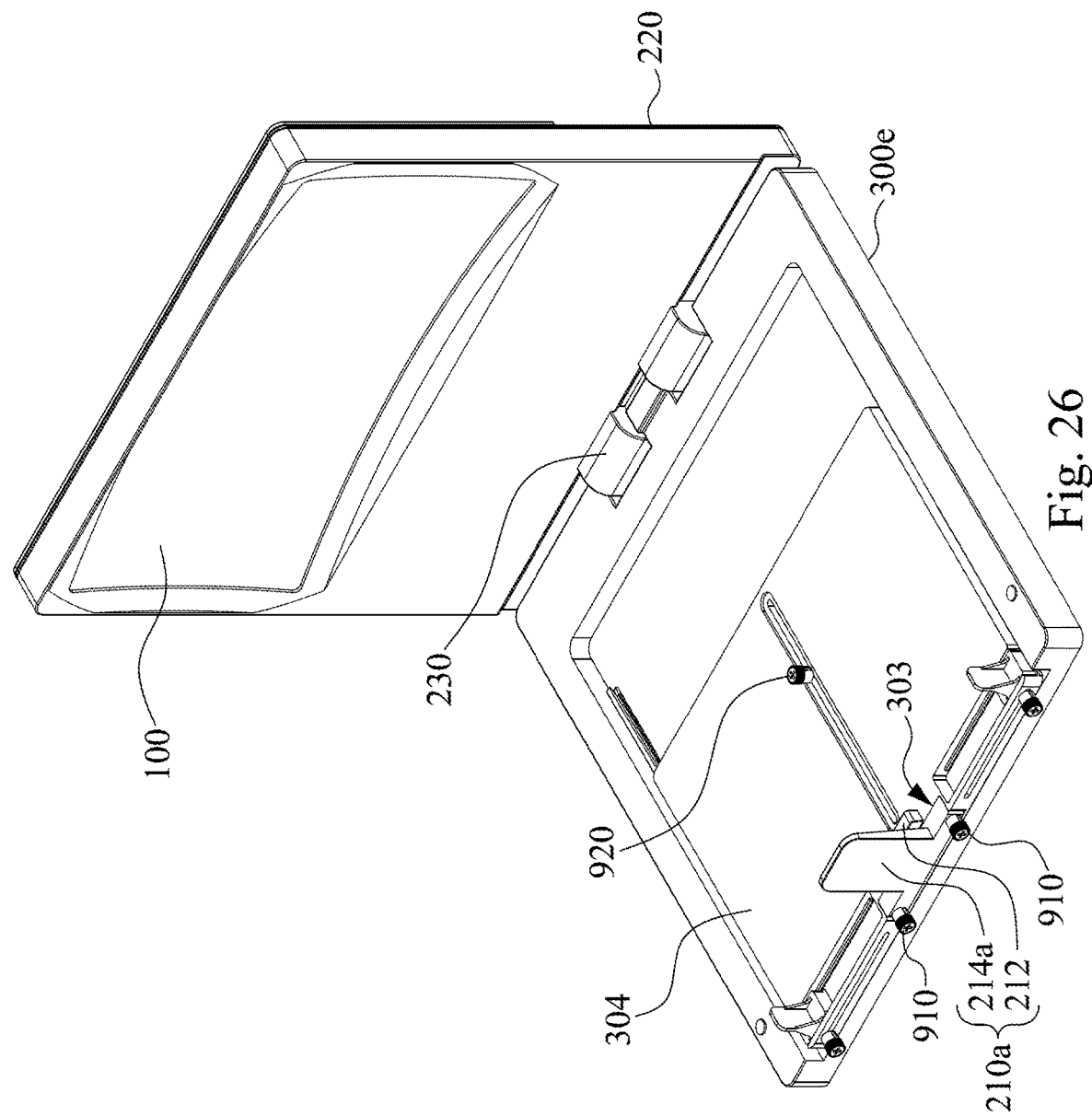
FIGS. 26 and 27 are perspective views of the mixed reality assembly in accordance with some embodiments of the present disclosure.
Figure 27:
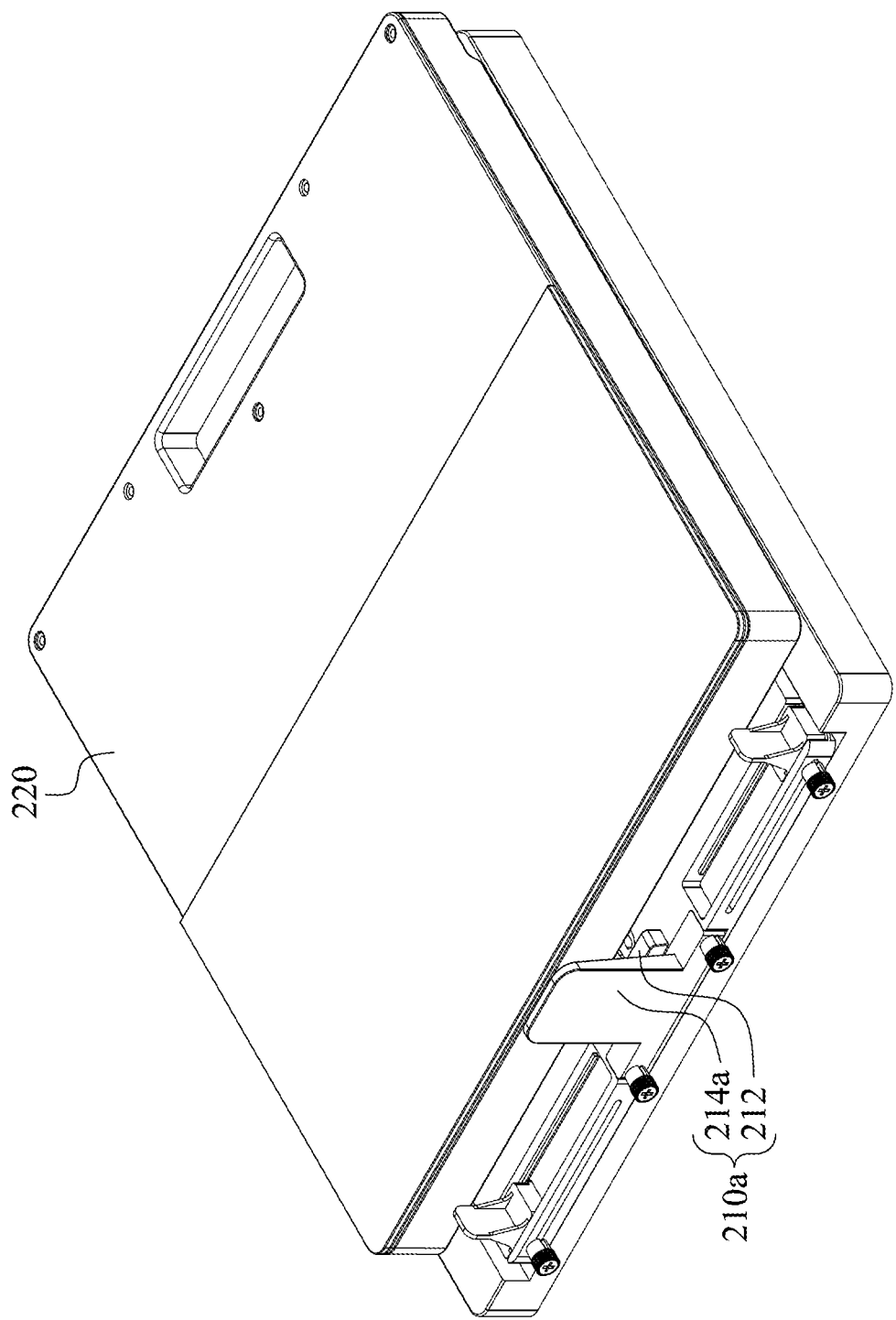

FIGS. 26 and 27 are perspective views of the mixed reality assembly according to some embodiments of the present disclosure. As shown in FIGS. 26 and 27, the main difference between the present embodiment and the above-mentioned embodiments is that the back railing 214a of the first holder 210a is movable relative to the front railing 212. In particular, the back railing 214a is in a recess portion 303 of the base 300e. The mixed reality assembly includes a plurality of first screws 910 penetrating through the back railing 214a and fastened to the recess portion 303 of the base 300e. Therefore, when the first screws 910 are loosened, the user can move the back railing 214a backward and forward to control the distance between the back railing 214a and the front railing 212. When the portable apparatus is placed between the front railing 212 and the back railing 214a, the user can tighten the first screws 910 to fix the portable apparatus. By using such a configuration, the mixed reality assembly is suitable for use with portable apparatuses having different thicknesses.

Furthermore, in some embodiments, the mixed reality assembly further includes a second screw 920 fastened to the top surface 304 of the base 300e. The user can rotate the second screw 920 to change a protruding height of the second screw 920 on the top surface 304. As a result, when the second holder 220 is rotated about the hinge 230 by a certain angle toward the base 300e, the second screw 920 contacts the second holder 220 to support the second holder 220. Therefore, the second screw 920 can prevent the second holder 220 from continuing to rotate downward and thereby avoid the rotation angle of the hinge 230 from exceeding the allowable range and ultimately prevent the hinge 230 from being broken.

Figure 28:
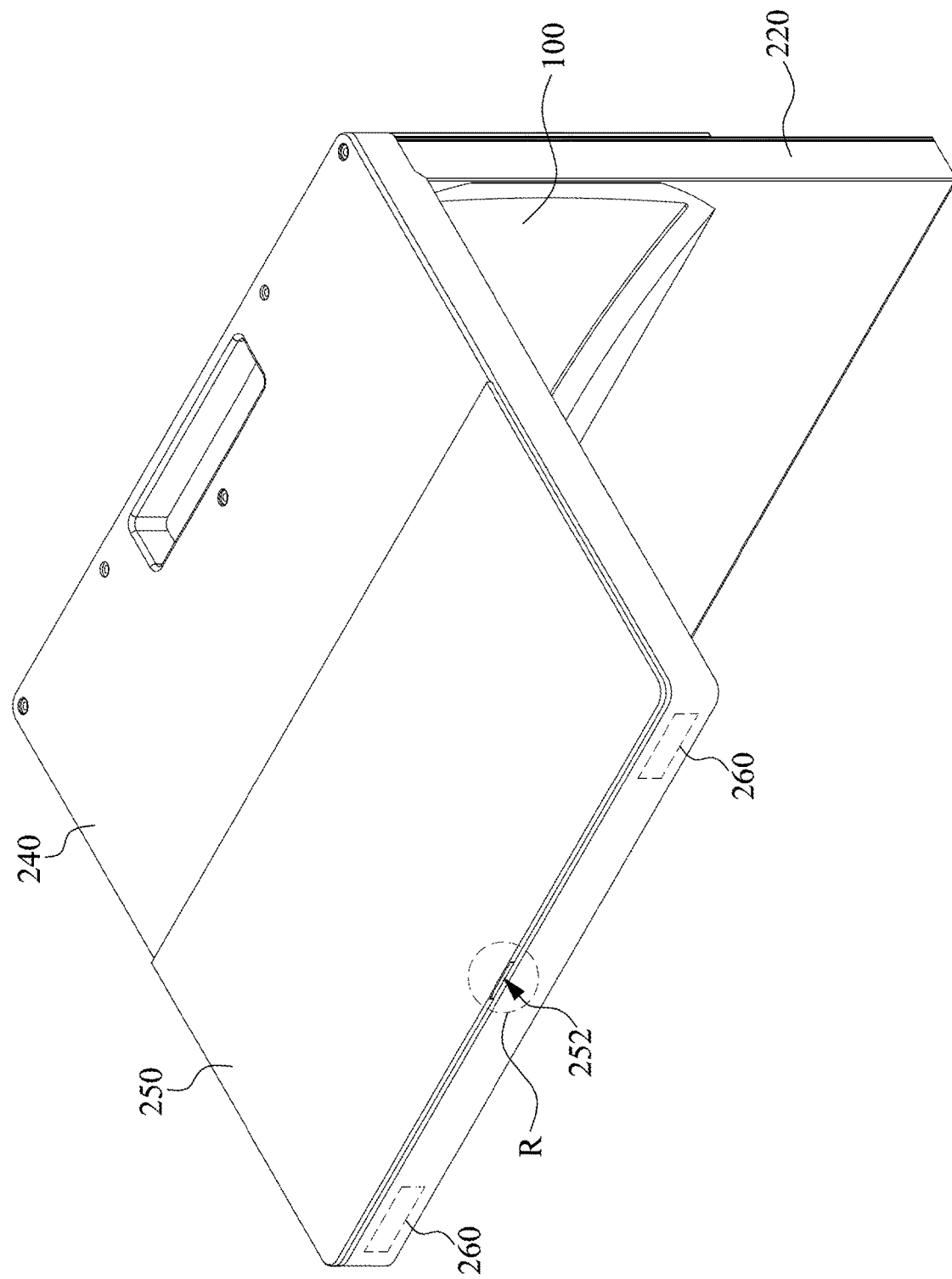
FIG. 28 is a partial perspective view of the mixed reality assembly in accordance with some embodiments of the present disclosure.

FIG. 28 is a partial perspective view of the mixed reality assembly according to some embodiments of the present disclosure. The main difference between the present embodiment and the above-mentioned embodiments is that the mixed reality assembly further includes a third holder 240 on the second holder 220 and a cover lens 250 on the third holder 240. The third holder 240 is connected to the top edge of the second holder 220 and extends along a direction substantially perpendicular to the second holder 220. The cover lens 250 is disposed on the top surface of the third holder 240. In some embodiments, the cover lens 250 is arranged demountably with the third holder 240. For example, the cover lens 250 is magnetic, and the third holder 240 has a magnet 260. Therefore, the cover lens 250 can attach to the third holder 240 by magnetic attraction.

Figure 29:
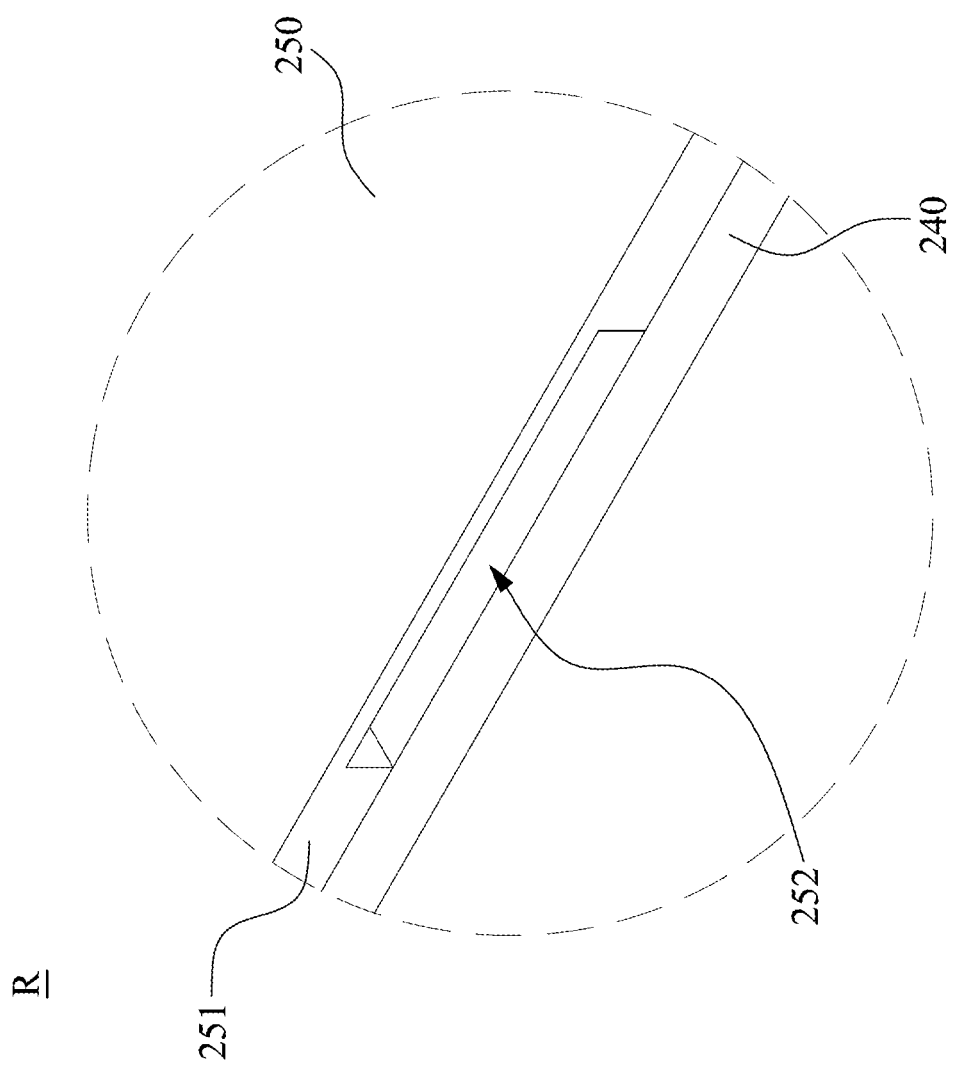
FIG. 29 is an enlarged view of a partial region R shown in FIG. 28.

FIG. 29 illustrates an enlarged view of a partial region R shown in FIG. 28. As shown in FIGS. 28 and 29, the cover lens 250 has a sidewall 251 and a slot 252 formed in the sidewall 251. Therefore, the user can insert a tool or a fingertip into the slot 252 and exert an upward force on the cover lens 250. When the upward force applied by the user is greater than the force of the magnetic attraction of the cover lens 250 and the magnet 260 (see FIG. 28), the cover lens 250 and the third holder 240 can be separated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A device for mixed reality, comprising:
a curved mirror having a concave surface, a convex surface opposite to the concave surface, and a light transmissive medium between the concave surface and the convex surface; and
a first holder disposed in front of the concave surface and within a focal length of the curved mirror and configured to support a portable apparatus, wherein the first holder has a curved surface configured to reflect a sound wave from the portable apparatus to the curved mirror.

2. The device of claim 1, further comprising:
an external speaker disposed under the curved mirror and configured to emit a sound toward the portable apparatus.

3. The device of claim 2, wherein the external speaker is separated from the first holder.

4. The device of claim 1, wherein the first holder includes a plurality of separators configured to support a bottom surface of the portable apparatus.

5. The device of claim 4, wherein at least one of the separators is configured to be disposed between two speaker openings of the portable apparatus.

6. The device of claim 4, wherein the first holder includes a front railing closer to the curved mirror than the separators being, and a top of the front railing is higher than a top of at least one of the separators.

7. The device of claim 4, wherein the first holder includes a back railing farther from the curved mirror than the separators being, and a top of the back railing is higher than a top of at least one of the separators.

8. The device of claim 7, wherein the separators protrude from the back railing at intervals.

9. A device for mixed reality, comprising:
a base;
a curved mirror standing on the base and having a concave surface, a convex surface opposite to the concave surface, and a light transmissive medium disposed between the concave surface and the convex surface;
a first holder standing on the base and disposed in front of the concave surface and within a focal length of the curved mirror and configured to support a portable apparatus, wherein the portable apparatus is canted at an angle with respect to the base; and
a speaker disposed on the base and adjacent to the curved mirror, wherein the speaker emits a sound in a direction that the concave surface of the curved mirror faces.

10. The device of claim 9, wherein the first holder has a curved surface under the portable apparatus.

11. The device of claim 10, wherein the curved surface is separated from the speaker.

12. The device of claim 9, wherein the first holder includes a plurality of separators configured to support a bottom surface of the portable apparatus.

13. The device of claim 12, wherein at least one of the separators is configured to be disposed between two speaker openings of the portable apparatus.

14. The device of claim 12, wherein the first holder includes a front railing closer to the curved mirror than the separators being, and a top of the front railing is higher than a top of at least one of the separators.

15. The device of claim 12, wherein the first holder includes a back railing farther from the curved mirror than the separators being, and a top of the back railing is higher than a top of at least one of the separators.

16. A device for mixed reality, comprising:
a base;
a curved mirror standing on the base and having a concave surface, a convex surface opposite to the concave surface, and a light transmissive medium between the concave surface and the convex surface;
a first holder standing on the base and disposed in front of the concave surface and within a focal length of the curved mirror and configured to support a portable apparatus, wherein the base is between the first holder and the curved mirror; and
a speaker disposed on the base,
wherein the curved mirror produces a virtual image by an image displayed by the portable apparatus, and when a change of the virtual image occurs, the speaker emits a sound in response to the change of the virtual image.

17. The device of claim 16, wherein the first holder includes a plurality of separators configured to support a bottom surface of the portable apparatus.

18. The device of claim 17, wherein at least one of the separators is configured to be disposed between two speaker openings of the portable apparatus.

19. The device of claim 17, wherein the first holder includes a front railing closer to the curved mirror than the separators being, and a top of the front railing is higher than a top of at least one of the separators.

20. The device of claim 17, wherein the first holder includes a back railing farther from the curved mirror than the separators being, and a top of the back railing is higher than a top of at least one of the separators.

* * * * *